United States Patent [19]

Yoshimi et al.

[11] Patent Number: 5,684,529
[45] Date of Patent: Nov. 4, 1997

[54] STEREOSCOPIO DISPLAY USING MOVEMENT DIRECTION DETECTION

[75] Inventors: Takashi Yoshimi; Hiroshi Otsubo; Masanori Nakaigawa, all of Tokorozawa; Ryuichiro Yoshimura, Tokyo-to; Manabu Okamoto, Tokorozawa; Yoshiki Furuta, Tokorozawa; Chihaya Oga, Tokorozawa; Minoru Tateno, Tokorozawa, all of Japan

[73] Assignee: Pioneer Electronic Corporation, Tokyo-to, Japan

[21] Appl. No.: 438,277

[22] Filed: May 10, 1995

[30] Foreign Application Priority Data

May 13, 1994 [JP] Japan ................... 6-100286
Sep. 16, 1994 [JP] Japan ................... 6-221666

[51] Int. Cl.[6] .................. H04N 13/04; H04N 7/18
[52] U.S. Cl. ............................. 348/43; 348/55
[58] Field of Search .................. 348/43, 42, 46, 348/47, 49, 50, 51, 54, 55, 56, 57, 58, 59, 60; H04N 7/18

[56] References Cited

U.S. PATENT DOCUMENTS 4,480,263 10/1984 Van Merode ................. 348/60
4,562,463 12/1985 Lipton ....................... 348/56
4,704,627 11/1987 Yuyama et al. ............... 348/43
5,155,750 10/1992 Klynn et al. ................. 348/54

FOREIGN PATENT DOCUMENTS 161294  7/1987  Japan .
245090 10/1988  Japan .
114293  5/1989  Japan .

Primary Examiner—Tommy P. Chin
Assistant Examiner—Bryan S. Tung
Attorney, Agent, or Firm—Kane, Dalsimer, Sullivan, Kurucz, Levy, Eisele and Richard, LLP

[57] ABSTRACT

A stereoscopic image displaying apparatus includes: field switching signal generating unit for generating a field switching signal alternately indicating odd field periods and even field periods from an original picture signal; delaying unit for delaying the original picture signal and producing a delayed picture signal; stereoscopic image signal generating unit for alternately selecting one of the original picture signal and the delayed picture signal in accordance with the field switching signal to generate a stereoscopic image signal; and display unit for displaying the stereoscopic image signal by alternately supplying pictures of the original picture signal to one eye of a user and pictures of the delayed picture signal to the other eye of the user on the basis of the field switching signal.

12 Claims, 17 Drawing Sheets

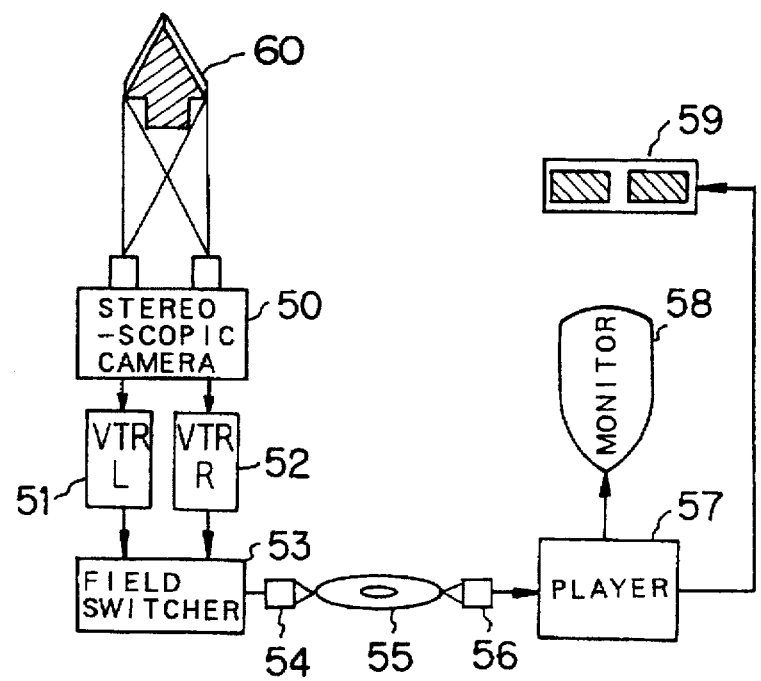
FIG. 1A
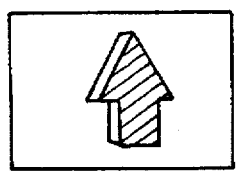
LEFT-EYE PICTURE
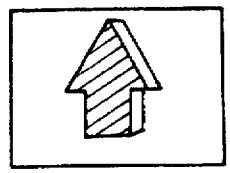
RIGHT-EYE PICTURE
FIG. 1B

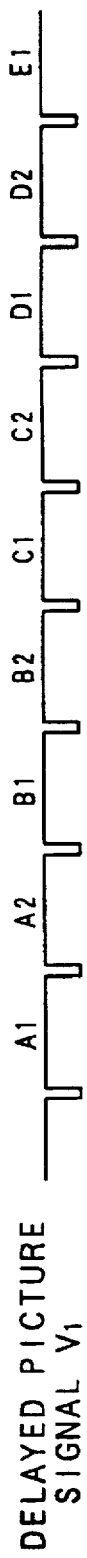
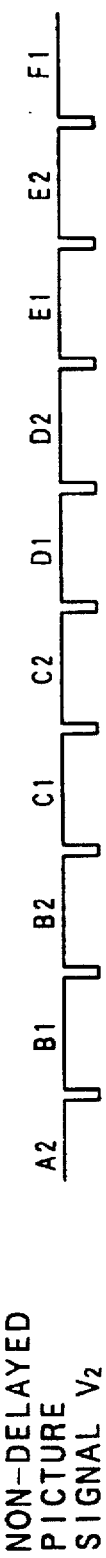
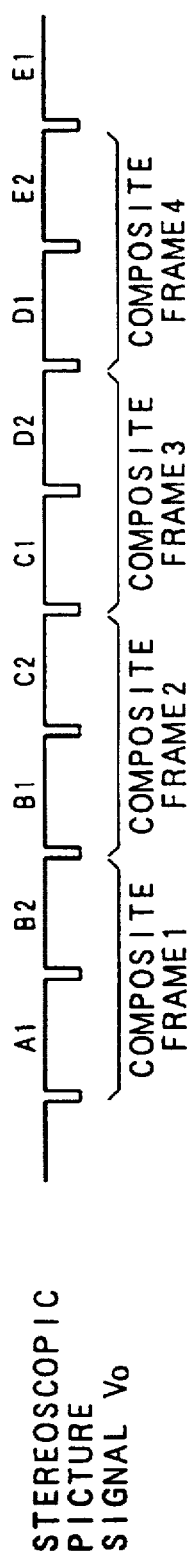

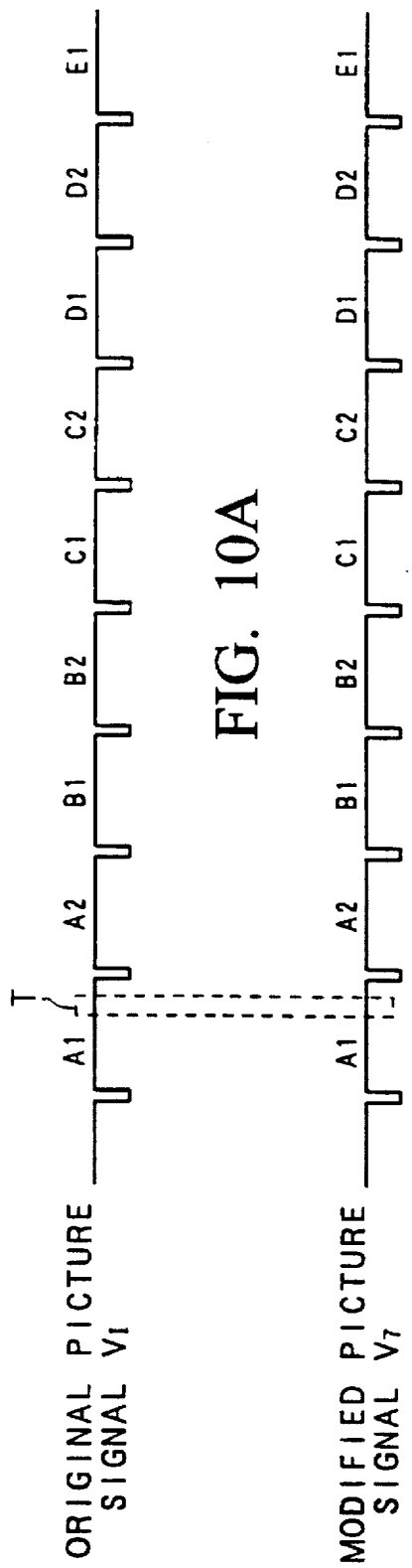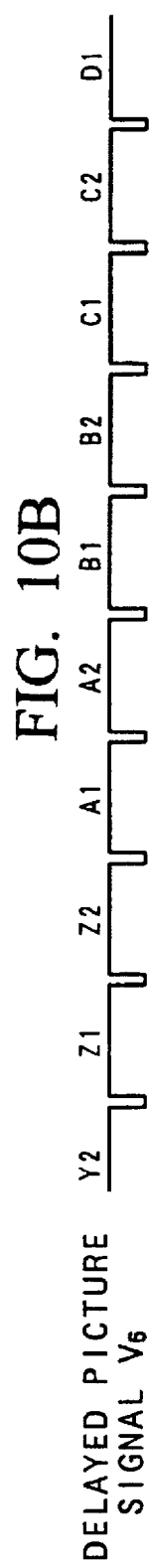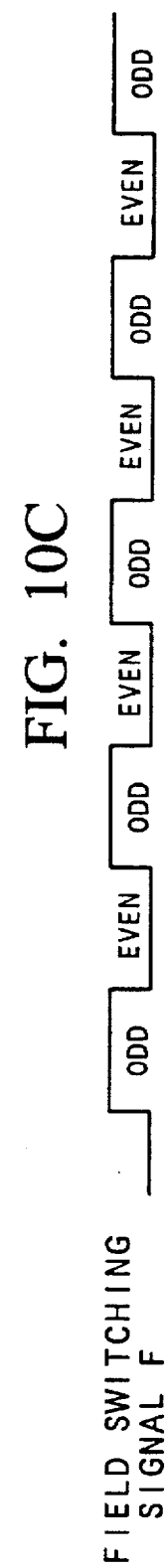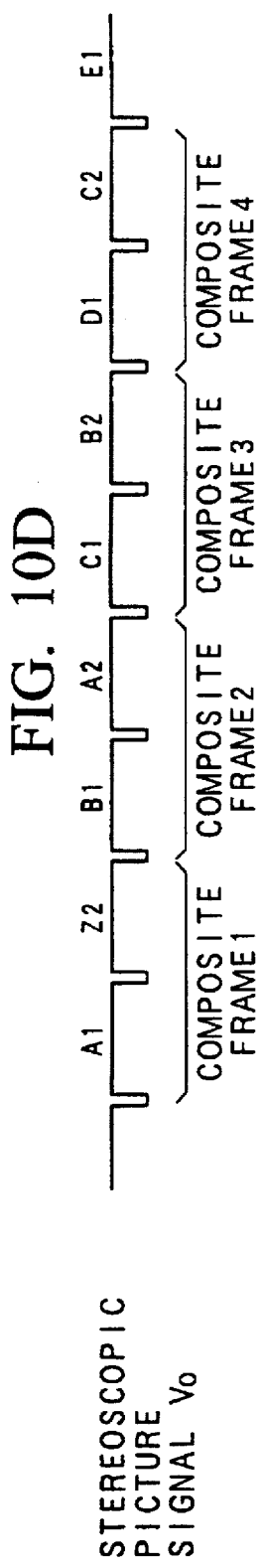

STEREOSCOPIO DISPLAY USING MOVEMENT DIRECTION DETECTION

BACKGROUND OF THE INVENTION

1. Field of the Invention

This invention relates to a technique of displaying stereoscopic images, and more particularly to an apparatus for and a method of displaying stereoscopic images by supplying field pictures alternately to eyes of a user using a liquid crystal shutter or the like.

2. Description of the Prior Art

When a person sees an object, his left and right eyes capture slightly different pictures because the eyes on his face are spaced from each other. The difference of the pictures is generally called a parallax. When seeing the object, the viewer composes the pictures having the parallax in his head and feels the sense of stereoscopic (three-dimensional) image. There has been developed a stereoscopy displaying technique utilizing the parallax, in which pictures including parallax are supplied to the eyes of the viewer to give him the sense of stereoscopy (sense of three-dimensional image). In this connection, systems for displaying stereoscopic images have also been developed.

However, the above technique requires a stereoscopic camera for exclusive use, and the stereo-photographing by such a camera requires relatively high cost. The stereoscopic camera should synchronize left and right pictures with each other, arrange two pictures to give the appropriate parallax to the user between his eyes and prepare pictures of same quality for left- and right-eyes of the user. Therefore, the stereoscopic camera is more expensive than a normal (two-dimensional) video camera, and the photographing cost necessarily increases. In addition, due to the above-mentioned specialty of the stereoscopic camera, most of visual software, such as movie, music video or the like, are produced from normal (two-dimensional) video pictures photographed by the normal camera. Therefore, stereoscopic images cannot be produced by simply reproducing visual software on the market. For the above-described reasons, users are not in a good condition to easily enjoy the stereoscopic image display.

SUMMARY OF THE INVENTION

It is an object of the present invention to provide an apparatus for and a method of displaying stereoscopic images with ease, using normal visual software on the market photographed by a normal video camera.

According to one aspect of the present invention, there is provided a stereoscopic image displaying apparatus including: field switching signal generating unit for generating a field switching signal alternately indicating odd field periods and even field periods from an original picture signal; delaying unit for delaying the original picture signal and producing a delayed picture signal; stereoscopic image signal generating unit for alternately selecting one of the original picture signal and the delayed picture signal in accordance with the field switching signal to generate a stereoscopic image signal; and display unit for displaying the stereoscopic image signal by alternately supplying pictures of the original picture signal to one eye of a user and pictures of the delayed picture signal to the other eye of the user on the basis of the field switching signal.

In accordance with the stereoscopic image displaying apparatus thus constructed, the field switching signal generating unit generates the field switching signal, and the delaying unit produces the delayed picture signal from the original picture signal. The stereoscopic image signal generating unit generates the stereoscopic image signal in which the original picture signal and the delayed picture signal appear alternately at every successive field periods. The display unit supplies one of the original pictures and the delayed pictures to one of the eyes of the user, and supplies the other of the pictures to the other eye, e.g., the original picture to left eye and the delayed picture to right eye. Namely, the user sees only the original pictures by his left eye and sees only the delayed pictures by his right eye. Since the original picture and the delayed picture have the parallax therebetween, the user can see a stereoscopic image.

According to another aspect of the present invention, there is provided a stereoscopic image displaying apparatus including: field switching signal generating unit for generating a field switching signal alternately indicating odd field periods and even field periods from an original picture signal; delaying unit for delaying the original picture signal and producing a delayed picture signal; display position control unit for modifying one of the original picture signal and the delayed picture signal so as to shift the display position of thereof in horizontal direction on a monitor; stereoscopic image signal generating unit for alternately selecting one of the original picture signal and the delayed picture signal in accordance with the field switching signal to generate a stereoscopic image signal; display unit, having the monitor, for displaying the stereoscopic image signal by alternately supplying pictures of the original picture signal to one eye of a user and pictures of the delayed picture signal to the other eye of the user on the basis of the field switching signal.

In accordance with the stereoscopic image displaying apparatus thus constructed, the field switching signal generating unit generates the field switching signal, and the delaying unit produces the delayed picture signal from the original picture signal. The display position shifting unit shifts the display position of one of the original picture signal and the delayed picture signal in horizontal direction of the monitor. The stereoscopic image signal generating unit generates the stereoscopic image signal in which the original picture signal and the delayed picture signal appear alternately at every successive field periods. The display unit supplies one of the original pictures and the delayed pictures to one of the eyes of the user, and supplies the other of the pictures to the other eye, e.g., the original picture to left eye and the delayed picture to right eye. Namely, the user sees only the original pictures by his left eye and sees only the delayed pictures by his right eye. Since the display position shifting unit shifts the position of the picture signal included in the stereoscopic image signal, the user can see a stereoscopic image even in a still picture portion of original picture.

According to still another aspect of the present invention, there is provided a stereoscopic image displaying apparatus including: a controller for controlling a picture signal reproducing device to output a picture signal and another picture signal reproducing device to output a delayed picture signal identical to the picture signal with a delay time therebetween; a field discriminating unit for discriminating field of the picture signal and outputting a field switching signal alternately indicating odd field periods and even field periods; a stereoscopic image signal generating unit for alternately selecting one of the picture signal and the delayed picture signal in accordance with the field switching signal to generate a stereoscopic image signal; and display unit for displaying the stereoscopic image signal by alternately supplying pictures of the picture signal to one eye of a user and pictures of the delayed picture signal to the other eye of the user on the basis of the field switching signal.

In accordance with the stereoscopic image displaying apparatus thus constructed, the field discriminating unit produces the field switching signal, and the stereoscopic image signal generating unit generates the stereoscopic image signal using the picture signals, having a delay time therebetween, reproduced by two picture signal reproducing devices. The stereoscopic image signal generating unit generates the stereoscopic image signal in which the original picture signal and the delayed picture signal appear alternately at every successive field periods. The display unit supplies one of the delayed and non-delayed pictures to one eye of the user, and supplies the other to the other eye of the user. Since the non-delayed picture and the delayed picture have the parallax therebetween, the user can see a stereoscopic image. The apparatus utilizes the normal picture reproducing devices, and hence the stereoscopic image display can be readily accomplished.

According to still another aspect of the present invention, there is provided a method of displaying a stereoscopic image including the steps of: (a) receiving an original picture signal; (b) delaying the original picture signal to produce a delayed picture signal; and (c) alternately supplying pictures of the original picture signal to one eye of a user and pictures of the delayed picture signal to the other eye of the user, at every successive field periods of the original picture signal.

In accordance with the above method, one of the original pictures and the delayed pictures to one of the eyes of the user, and supplies the other of the pictures to the other eye, e.g., the original picture to left eye and the delayed picture to right eye. The user sees only the original pictures by his left eye and sees only the delayed pictures by his right eye. Since the original picture and the delayed picture have the parallax therebetween, the user can see a stereoscopic image.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 1A is a block diagram illustrating a stereoscopy system for recording and reproducing stereoscopic images;

FIG. 1B is a view illustrating left-eye and right-eye images taken by the system shown in FIG. 1A;

FIGS. 4A and 4D are timing charts illustrating states of the signals shown in FIG. 3;

FIGS. 10A through 10E are timing charts of the signals operated in the apparatus shown in FIG. 9;

DESCRIPTION OF THE PREFERRED EMBODIMENTS

Figure 2A:
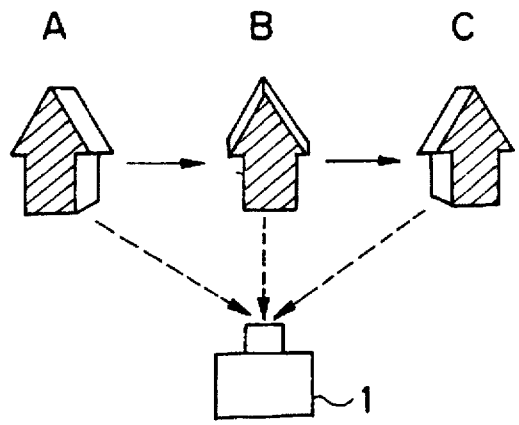
FIG. 2A illustrates a positional relationship between an object and a camera.

Preferred embodiments of the present invention will be described below with reference to the accompanying drawings.

Fundamental concept of stereoscopic display

Prior to the description of the preferred embodiments of the present invention, a fundamental concept of stereoscopic display will be described. FIG. 1A illustrates a stereoscopy system for recording and reproducing stereoscopic images. The stereoscopic camera 50 photographs the object 60 using two lenses spaced from each other with an interval approximately equal to the interval of eyes of a human being, so as to take pictures of the object 60 with a pseudo-parallax equivalent to the parallax produced by the eyes of a viewer. The pictures taken by the stereoscopic camera 50 are supplied to the VTR 51 for left-eye picture and the VTR 52 for right-eye picture, respectively. The field switcher 53 switches at every successive field periods and alternately selects the left-eye picture and the right-eye picture to produce the stereoscopic picture signal in which the left-eye picture and the right-eye picture appears alternately at every successive field periods. The stereoscopic picture signal thus produced is recorded on the optical disc 55 by the pickup 54. In reproduction, the pickup 56 reads out the stereoscopic picture signal from the optical disc 55, and the player 57 demodulates the signal to display it on the monitor 58. At the same time, a field switching signal which is synchronous with the stereoscopic picture signal and whose logical level reverses at every field periods is supplied to the stereoscopic glasses 59. The stereoscopic glasses 59 have left- and right-electronic shutters, such as liquid crystal panels, which alternately open and close in response to the field switching signal. A user watching the monitor 58 with the stereoscopic glasses 59 attached to his face captures the right-eye picture by the right eye and the left-eye picture by the left-eye. FIG. 1B illustrates the left-eye picture and the right-eye picture taken by the stereoscopic camera 50. As seen from FIGS. 1A and 1B, these pictures include a parallax and are substantially equivalent to actually pictures captured by the eyes of the user watching the object 60. When seeing the left-eye picture by the left eye and the right-eye picture by the right-eye, the user can find the stereoscopic image of the object 60 in three-dimension as if it actually exists there.

Next, concepts and preferred embodiments of the present invention will be described. The present invention includes two concepts. A first concept is embodied in first to fourth embodiments and a second concept is embodied in fifth to eighth embodiments.

1st Concept of the Invention

Figure 2B:
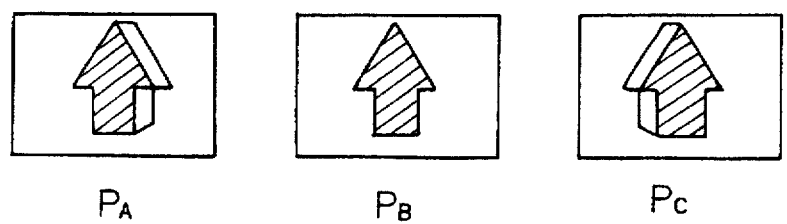
FIG. 2B illustrates pictures of the object photographed by the camera at the positions shown in FIG. 2A.

A first concept of the stereoscopic image display according to the present invention will be described. In order to give sense of stereoscopy to a user, the pictures captured by the eyes of the user need to have parallax between them. It is difficult to produce pictures with the parallax from pictures of a still object. However, in a case that the object is moving (or the camera is moving), the position and the orientation of the photographing with respect to the position of the object change as the time passes. If a picture of a moving object at a certain time point is compared with the picture at another time point, these pictures may have a relation analogous to that of the pictures taken by a stereoscopic camera, i.e., having the parallax therebetween. This will be described below in more detail. For example, when an object is moving from left to right, as shown in FIG. 2A, the pictures $P_A-P_C$ shown in FIG. 2B are obtained by photographing the object at the time points A–C. By comparing the pictures $P_A$ and $P_C$, it is recognized that the pictures $P_A$ and $P_C$ have a positional relation analogous to that of the left-eye and right-eye pictures shown in FIG. 1B. Therefore, by supplying two pictures of such a positional relation simultaneously to the eyes of the viewer, he sees the pictures with the parallax and feels a sense of a stereoscopic image. In summary, by supplying pictures having time difference therebetween, e.g., pictures sampled with delay time, simultaneously to the eyes, the viewer sees the pictures with the sense of stereoscopy. Since visual software on the market generally include numerous scenes in which people or objects move right to left or left to right, or the orientation of the camera is changed (a technique called "panning"), the stereoscopic image display described above can be accomplished in most of visual software on the market.

1st Embodiment

Figure 3:
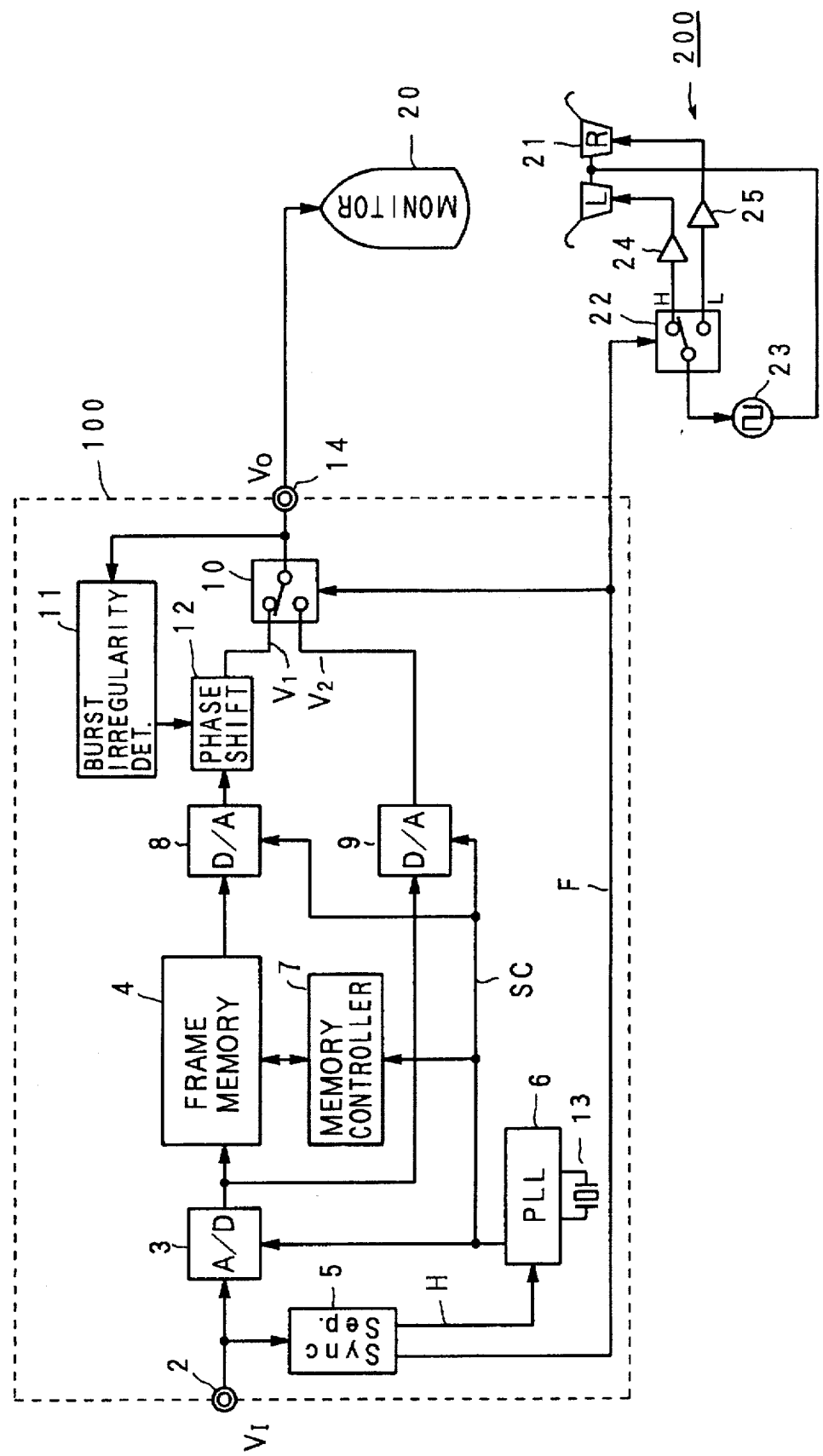
FIG. 3 is a block diagram illustrating a construction of a stereoscopic image displaying apparatus according to a first embodiment.

FIG. 3 illustrates a construction of a stereoscopic image displaying apparatus according to the first embodiment. As illustrated, the stereoscopic image displaying apparatus includes the reproduction device 100, the monitor 20 and the liquid crystal driver 200. The reproduction device 100 produces a stereoscopic picture signal $V_O$ from an original picture signal $V_I$ which is video signal of a two-dimensional image $G_1$. The components of the reproduction device 100 will be described. The A/D converter 3 conducts an A/D conversion onto the picture signal $V_I$ supplied from the input terminal 2. The frame memory 4 operates according to FIFO (First-In First-Out) manner, and stores digital picture data of one frame period. The frame memory 4 outputs the stored picture data with a delay time corresponding to one frame period (i.e., 1/30 sec.) at the read-out timings determined by the memory controller 7. The memory controller 7 controls data write timing and data read timing of the frame memory 4. The synchronizing signal separator 5 separates a synchronizing signal from the picture signal $V_I$, and outputs a horizontal synchronizing signal H and a field switching signal F indicating odd field periods and even field periods. Namely, the synchronizing signal separator 5 separates the synchronizing signals from the picture signal $V_I$ and supplies the horizontal synchronizing signal H (e.g., $f_H$=15.734 [kHz]) to the PLL circuit 6. In addition, the synchronizing signal separator 5 produces, from the vertical synchronizing signal, the field switching signal F in which High-level periods and Low-level periods corresponding to odd field periods and even field periods alternately and repeatedly appear (see. FIG. 4). The PLL circuit 6 receives an oscillation signal from the crystal oscillator 13. The PLL circuit 6 permits the operation of the reproduction device 100 to synchronize with the picture signal $V_I$, and outputs a sampling signal SC indicating timings of A/D conversion of the picture signal $V_I$. The frequency of the sampling signal SC should be high enough (i.e., higher than $4 f_{sc}$) to correctly digitize the picture signal $V_I$, e.g., 14.3 [MHz]. The D/A converter 8 converts the original picture data delayed by the frame memory 4 into an analog picture signal $V_1$, and the D/A converter 9 converts the non-delayed picture data into an analog picture signal $V_2$. The switch 10 is constituted by an analog switch, a multiplexer or the like, and switches the delayed picture signal $V_1$ and the non-delayed picture signal $V_2$ in accordance with the field switching signal F. The stereoscopic picture signal $V_O$ outputted by the switch 10 is supplied to the monitor 20 via the output terminal 14. The monitor 20 displays the stereoscopic pictures on its screen. The burst irregularity detector 11 detects phase errors of color sub-carrier wave signals resulting from the delay of the field pictures by the frame memory 4. The phase shifting circuit 12 shifts the phase of the color sub-carrier wave signal (e.g., 140 [ns]), in response to the detection signal of the burst irregularity detector 11, when the phase thereof is in reversed condition, so that the phase condition becomes regular.

The liquid crystal driver 200 includes the stereoscopic glasses 21, the switch 22, the oscillator 23 and the drivers 24 and 25. The stereoscopic glasses 21 are worn by a user and have left and right liquid crystal panels driven independently of each other. The switch 22 alternately selects one of the left and right liquid crystal panels in response to the field switching signal F. The oscillator 23 generates a modulation pulse signal (e.g., square wave of 300 [Hz], ranging from −5 to +5 [V]), and the drivers 24 and 25 drive the liquid crystal panels 24 and 25 according to the modulation pulse signal. In stead of the liquid crystal driver 200, a stereoscopic image display for exclusive use may be employed as the monitor 20. In such a case, the stereoscopic image display supplies one of the delayed picture and the non-delayed picture to the left eye of the viewer and the other to the right eye of the viewer, independently. Although NTSC system is used as the television system in the above description, the present invention is applicable to other systems such as PAL (Phase Alternation by Line) system or SECOM (SEquential COlor and Memory) system. In such cases, the oscillation frequency of the crystal oscillator 13 and the shift quantity of the phase shifting circuit 12 should be altered.

Next, an operation of the stereoscopic image displaying apparatus according to the first embodiment will be described with reference to FIG. 4. The picture signal $V_I$ inputted to the apparatus 100 is a video signal according to a known television system such as NTSC system. As the video source to be inputted, video signal including moving picture component, especially in horizontal direction, is preferable. The original picture signal digitized by the A/D converter 3 is supplied to the frame memory 4 and stored therein under the control of the memory controller 7. The frame memory 4 outputs the stored picture data with a delay time corresponding to one frame period, i.e., 1/30 [sec.], at the timing determined by the memory controller 7. The D/A converter 8 converts the digital picture data into the analog picture signal $V_1$. Then, the burst irregularity detector 11 and the phase shifting circuit 12 correct, in combination, the phase error of the color sub-carrier wave signal of the picture signal $V_1$. The picture signal $V_1$ delayed by the frame memory 4 (hereinafter referred to as "delayed picture signal") is then supplied to an input terminal of the switch 10 after the phase error correction. On the other hand, the original picture data outputted by the A/D converter 3 is directly supplied to the D/A converter 9 to be converted into the analog picture signal $V_2$ (hereinafter referred to as "non-delayed picture signal") and is supplied to the other input terminal of the switch 10. The switch 10 selects the delayed picture signal $V_1$ when the field switching signal is high level, and selects the non-delayed picture signal $V_2$ when the field switching signal is low level.

FIG. 4 illustrates states of the signals shown in FIG. 3 according to the above described operation. In FIG. 4, the alphabets A, B, C, . . . specify frame pictures, and the numbers 1, 2, . . . attached to the alphabets specify field pictures. Namely, A1 represents an odd field picture and A2 represents an even field picture. The field pictures A1 and A2 constitute a frame picture A. As seen from FIG. 4, the delayed picture signal $V_1$ is two fields behind the non-delayed picture signal $V_2$. When the level of the field switching signal F changes as shown in FIG. 4, the switch 10 outputs the stereoscopic picture signal $V_0$ which alternately provides the delayed field pictures $V_1$ and the non-delayed field pictures $V_2$. That is, the composite frame picture 1 consists the delayed field picture A1 and the non-delayed field picture B2. In the stereoscopic picture signal $V_0$, each of the successive frame pictures A, B, C, . . . include the field pictures having time delay of 1/60 [sec] therebetween, and therefore the pictures are displayed unstably on the monitor 20 with fluctuation or irregular movement because the field pictures of different frame are displayed. On the other hand, the field switching signal F is supplied to the switch 22 to which the driving pulse signal is supplied from the oscillator 23. The driving pulse signal selected by the switch 22 is supplied to one of the left and the right liquid crystal panels via the drivers 24 or 25. Namely, the left liquid crystal panel and the right liquid crystal panel are alternately driven, at every field periods, according to the field switching signal F. When the driving pulse signal is applied to the liquid crystal panels, the liquid molecules thereof are oriented to a single direction and an optical rotatory power thereof is lost, thereby transmitting light. When the driving pulse signal is not applied, the liquid crystal panels retain the optical rotatory power and do not transmit light. Namely, the stereoscopic glasses 21 function as optical shutters which alternately and repeatedly open and close at every successive field periods. Since the opening and closing of the liquid crystal panels are responsive to the field switching signal F which is synchronous with the stereoscopic picture signal $V_0$ displayed on the monitor 20, the user wearing the stereoscopic glasses 21 sees only odd field pictures by his left eye and sees only the even field pictures by his right eye. As shown in FIG. 4, while the field picture A1 is displayed on the monitor 20, the switch 22 selects the H-side output terminal, and therefore the left liquid panel of the stereoscopic glasses 21 becomes transmissible. On the other hand, while the field picture B2 is displayed on the monitor 20, the switch 22 selects the L-side output terminal, and therefore the right liquid panel of the stereoscopic glasses 21 becomes transmissible. In this manner, odd and even field pictures are alternately displayed, and the user sees only the odd field pictures A1, B1, C1, . . . by his left eye and only the even field pictures B2, C2, D2, . . . by his right eye. In this case, the field pictures supplied to the user's right eye are one frame period (i.e., two fields) behind the field pictures supplied to the user's left eye. In other words, user sees odd field picture of a frame by his left eye and simultaneously sees even field picture of a next frame by his right eye. Therefore, when the pictures include moving picture component in horizontal direction, the pictures captured by the left eye and the right eye are shifted, in display position, from each other on the monitor 20. In this way, the user sees the shifted pictures having the parallax produced therebetween, and feels the sense of stereoscopic images.

According to the first embodiment, picture data having the parallax used for stereoscopic display can be produced from a normal, two-dimensional video signals. By switching the stereoscopic glasses by the switching signal used for the production of the stereoscopic picture signal, stereoscopic display may be readily performed. It is preferable, like the above description, the field picture supplied to one of the eyes is delayed for one or a few frame period units from the other field picture. Delaying the field pictures by frame period units ensures smooth reproduction of the stereoscopic pictures. If one of the field picture has a delay of one or more field period units, pictures of identical field (odd or even) occasionally appear in succession, and the pictures displayed lack smoothness. However, delaying the picture for one or few fields advantageously results in reduction of memory capacity, and the above drawback may be allowable when the movement of the picture is relatively slow. As the field switching signal, a field discrimination signal obtained by a field discrimination technique may be used. According to this technique, number of equalizing pulses contained in a vertical blanking period of the picture signal is counted and the kind of the field (odd or even) is discriminated based on the result of the counting. Normally, a synchronizing signal separation circuit includes the function of producing the field discrimination signal. Further, in stead of the field switching signal, additional information such as Philips code of video disc may be used. The Philips code includes different codes in different fields, and the kind of the field can be discriminated by referring to the codes. In case of utilizing the Philips code, a decoder of the Philips code functions as a switching signal generator.

2nd Embodiment

Next, the second embodiment of the present invention will be described. When a person sees a stereoscopic image produced by the picture signals having parallax with his eyes, a line connecting the left eye and the object (hereinafter referred to as "view line of left eye") and a line connecting the right eye and the object (hereinafter referred to as "view line of right eye") cross at a position either before or behind the screen. Specifically, when the picture captured by the left eye is positioned on the right side of the picture captured by the right eye on the screen, the view lines of the left eye and the right eye cross before the screen and the stereoscopic image appears before the screen (i.e., at the viewer's side of the screen). Reversely, when the picture captured by the left eye is positioned on the left side of the picture captured by the right eye, the view lines of the left eye and the right eye cross behind the screen and the stereoscopic image appears behind the screen (i.e., over the screen). When the field picture is simply delayed like the manner of the first embodiment, the positional relationship in the horizontal direction between the pictures captured by the left and right eyes changes according to the moving direction of the picture, i.e., moving direction of images of people, objects, etc. in the picture (the movement of the images of the objects or the like in the pictures will be hereinafter simply referred as "movement of picture"). Namely, according to the moving direction of the picture, the position of the stereoscopic image changes, before or behind the screen. In this view, in the second embodiment, the stereoscopic image is produced so as to be constantly positioned on either before or behind the screen, irrespective of the moving direction of the picture.

Figure 5:
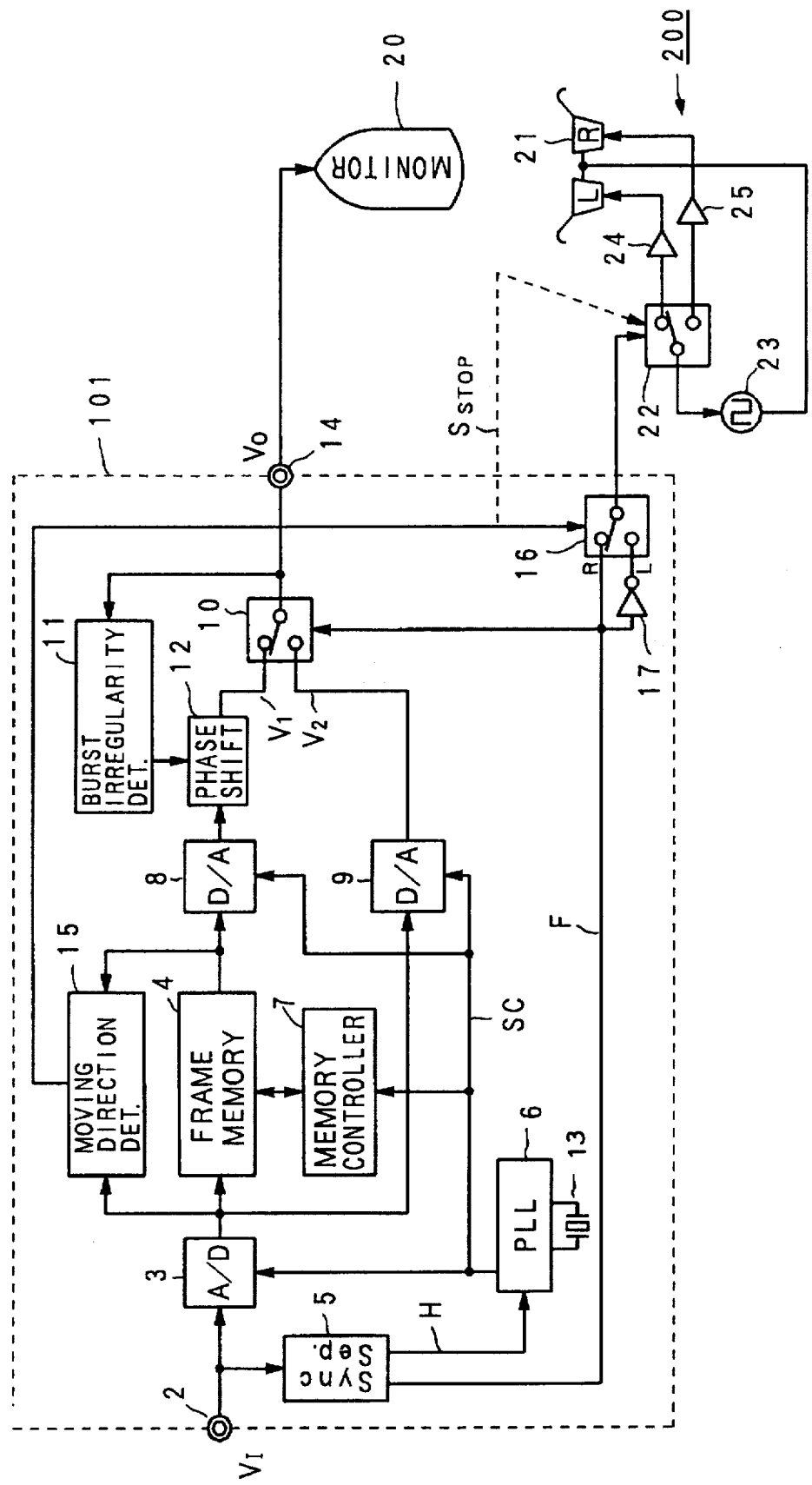
FIG. 5 is a block diagram illustrating a construction of a stereoscopic image displaying apparatus according to a second embodiment.

FIG. 5 illustrates a construction of a stereoscopic image displaying apparatus according to the second embodiment. As illustrated, the apparatus includes the reproduction device 101 for reproducing a stereoscopic picture signal, the monitor 20 for displaying the stereoscopic pictures and the liquid crystal driver 200 worn by the user to see the stereoscopic image. Since the structures and functions of the monitor 20 and the liquid crystal driver 200 are identical to those of the first embodiment shown in FIG. 3, detailed description thereof will be omitted. The components of the reproduction device 101 identical in structures to those of the device 100 shown in FIG. 3 are represented by identical reference numbers, and the description will be omitted. In comparison with the device 100 of the first embodiment, the reproduction device 101 further includes the moving direction detector 15, the switch 16 and the inverter 17. The moving direction detector 15 takes out the picture signals from the input-side and the output-side of the frame memory 4, and detects the moving direction of the picture. The switch 16 is turned over in response to the detection signal outputted by the moving direction detector 15, and the inverter 17 inverts the field switching signal F.

Next, an operation of the apparatus will be described. As the image source, an original picture signal $V_I$ containing moving picture component in horizontal direction is inputted to the reproduction device 101 via the input terminal 2. The moving direction detector 15 receives the non-delayed picture signal from the input-side of the frame memory 4 and the delayed picture signal from the output-side of the frame memory 4, and detects moving picture component using a known technique briefly described below.

In the moving direction detection, firstly, coordinates of moving points are detected. Then, quantity and direction of the movement of the points are detected by one of the following methods (a) to (c).

(a) Method of determining image movement which minimize the difference of successive pictures:

In this method, a position of a non-delayed picture is moved with respect to a delayed picture, and the position of the non-delayed picture where the difference between two pictures becomes minimum is detected. Then, the direction decided by the positions of two pictures is determined as the direction of the movement. More specifically, assuming that coordinate of a moving point is (x, y), coordinate of a delayed moving point is $g_{i-1}$ (x, y) and coordinate of a non-delayed point is $g_i$(x, y), the position of the non-delayed picture is shifted and the position where the value calculated by the following equation (1) or (2) becomes minimum is detected.

$$min\Sigma\Sigma\{g_i(x-\xi,y-\eta)-g_{i-1}(x,y)\}^2 \quad (1)$$

$$min\Sigma\Sigma|g_i(x-\xi,y-\eta)-g_{i-1}(x,y)| \quad (2)$$

The direction of the point thus obtained is reckoned as the moving direction of the picture. The calculation may be accelerated by counting number of the moving points having displacement larger than a threshold in a 8×8 or a 16×16 pixel block and detecting the coordinate where the number of such points is minimum.

(b) Method of determining picture movement which minimize cross-correlation function:

A cross-correlation function of the delayed point $g_{i-1}$(x, y) and the non-delayed point $g_i$(x, y) is calculated by the following equation:

$$h(\Sigma,\eta)=\int\int g_{i-1}(x,y)\cdot g_i(x-\Sigma,y-\eta)dxdy \quad (3)$$

Assuming that the point $g_{i-1}$(x, y) is shifted by a displacement $(\Sigma_0, \eta_0)$ and coincides with the point $g_i$(x, y), the cross-correlation function $h(\Sigma, \eta)$ takes a maximum value when the displacement equals to $(\Sigma_0, \eta_0)$. From this relationship, quantity and direction of the picture movement can be obtained.

(c) Method of determining picture movement utilizing Fourier transformation:

If Fourier transformation of the point g(x, y) is expressed by $G(\mu, \nu)$, Fourier transformation of a point displaced by (a, b) from the point $g_i$(x, y) is expressed by:

$$F\{g(x-a,y-b)\}=G(\mu,\nu)exp\{-2\pi j(\mu a+\nu b)\} \quad (4)$$

Assuming that the point $g_{i-1}$(x, y) is shifted by a displacement (a, b) and coincides with a point $g_{i-1}$(x−a, y−b), the following equation (5) is obtained and the displacement (a, b) can be calculated by the following equation.

$$F\{g_i(x,y)\}/F\{g_{i-1}(x,y)\}=exp\{-2\pi j(\mu a+\nu b)\} \quad (5)$$

By calculating the above equations (1)–(5) using a processor, the moving direction detector 15 detects movement of the picture, and quantity and direction thereof. The moving direction detector 15 is so designed as to output a detection signal "1" when the picture is moving right and to output a detection signal "0" when the picture is moving left. The switch 16 selects the terminal R to which the field switching signal is directly supplied, when the detection signal is "1", and selects the terminal L to which the inverted signal of the field switching signal F is supplied, when the detection signal is "0". Now, it is assumed that the picture is moving right. In this case, the moving direction detector 15 outputs the detection signal "1". The switch 16 selects the terminal R and hence the field switching signal F is supplied to the liquid crystal driver 200. In the liquid crystal driver 200, the left liquid crystal panel is transmissible when the field switching signal F is "1" and the right liquid crystal panel is transmissible when the field switching signal is "0". Accordingly, the field pictures captured by the left eye are constantly behind the field pictures captured by the right eye. In other words, the left eye keeps on receiving the field pictures which are delayed, in time, from the field pictures received by the right eye. Consequently, the left eye constantly captures the pictures of the objects slightly displaced to the left side of the pictures of the objects captured by the right eye, and the user sees the stereoscopic image behind the screen of the monitor 20.

When the moving direction of the pictures is reversed and the picture starts moving left, the moving direction detector 15 outputs the detection signal "0". The switch 16 selects the terminal L and the inverted signal of the field switching signal F is supplied to the liquid crystal driver 200. In this case, the left and right liquid crystal panels of the stereoscopic glasses 21 open and close at the timings reverse to the case where the picture is moving right, and hence the relation of the pictures captured by the left and right eyes is reversed. Namely, the field pictures captured by the right eye are behind the field pictures captured by the left eye. Since the picture is moving left, the right eye captures the pictures of the object slightly displaced to the right side of the pictures of the objects captured by the left eye, and the user sees the stereoscopic image behind the screen, like the case where the image is moving right.

As described above, according to the second embodiment, the stereoscopic images appear at stable position with respect to the screen, i.e., before or behind the screen, irrespective of the picture movement direction. In order to produce the stereoscopic image constantly before the screen, the logical level of the detection signal is reversed, or alternatively the inverter circuit 17 is arranged on the side of the terminal R of the switch 16. It is noted that the switch 16 and the inverter circuit 17 may be included in the liquid crystal driver 200.

In the above description, the stereoscopic glasses are alternately opened and closed at every field periods. However, this possibly makes the user feel the flicker of the images. In this view, the shutter operation of the stereoscopic glasses may be inhibited when the pictures do not include movement. The operation of this modification will be described. The moving direction detector 15 can easily detect whether the pictures include movement or not because it can detect moving direction of the pictures. When the moving direction detector 15 detects the absence of the movement in the pictures, an inhibition signal $S_{STOP}$ is supplied to the switch 22 in the liquid crystal device 200. Alternatively, the switch 22 may be so designed that the driving pulse signal from the oscillator 23 is supplied to both of the drivers 24 and 25 when the inhibition signal $S_{STOP}$ is effective (an additional switch for connecting the oscillator 23 and the switches 24 and 25 may be arranged). By the above arrangement, when the pictures do not include movement, the moving direction detector 15 makes the inhibition signal $S_{STOP}$ effective, and the switch 22 supplies the driving pulse signal to both of the drivers 24 and 25. The stereoscopic glasses 21 become transmissible at both left and right eye panels during still picture portion. As a result, the flicker of the images due to the shutter operation in the still picture portion is avoided and the user can enjoy the stereoscopic images without flicker.

3rd Embodiment

In the stereoscopic image display according to this invention, it is necessary that the pictures captured by the left and right eyes are displaced from each other on the screen with an appropriate interval. For example, if the movement of the picture is too fast and the pictures displayed on the screen are too much apart from each other, the pictures are felt not as a stereoscopic image but simply as two separate pictures. Reversely, if the movement of the picture is too slow and the positions of the left and right pictures on the screen are too close to each other, the parallax of the pictures is insufficient and the user cannot feel the sense of the stereoscopic image. In this view, in the third embodiment, moving quantity of the picture is detected and delay time of the picture is optimized.

Figure 6:
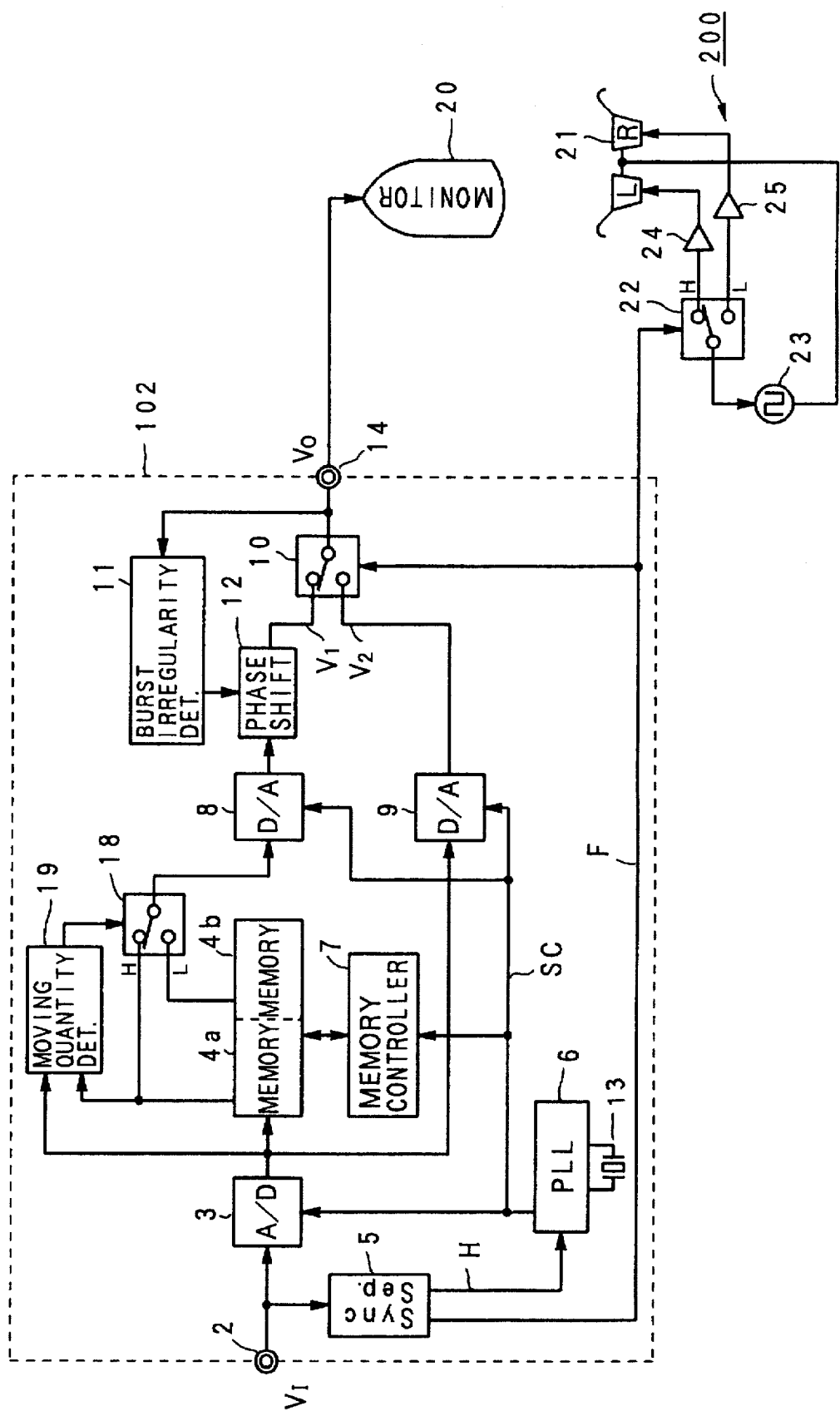
FIG. 6 is a block diagram illustrating a construction of the stereoscopic image displaying apparatus according to a third embodiment.

FIG. 6 illustrates a construction of the stereoscopic image displaying apparatus according to the third embodiment. As shown in FIG. 6, the apparatus includes the reproduction device 102, the monitor 20 and the liquid crystal driver 200. The monitor 20 and the liquid crystal driver 200 have structures identical to those of the first embodiment, respectively. In the reproduction device 102, components having the same structures and performing the same functions as those of the first embodiment are represented by the same reference numerals, and the description thereof will be omitted. The apparatus 102 differs from the apparatus 100 shown in FIG. 3 in two separate memories 4a and 4b, a moving quantity detector 19 and a switch 18. The memories 4a and 4b are field memories having given delay quantities (e.g., delay time corresponding to a field period). The output signal of the memory 4a is delayed by one field period from the original signal, and the output signal of the memory 4b is further delayed by one field period from the output signal of the memory 4a. The delay quantity of the memories 4a and 4b may be set to one frame period like the first embodiment, however, such a memory requires larger capacity. The moving quantity detector 19 receives outputs of the A/D converter 3 and the memory 4a. The switch 18 receives the picture signals delayed by the memories 4a and 4b, and selects one of them according to the output signal of the moving quantity detector 19.

The operation of the apparatus will be described. It is assumed that the input terminal 2 receives, as an original video signal $V_I$, pictures having movement of varying speed in horizontal direction. The moving quantity detector 19 calculates the moving quantity of the pictures using the delayed picture signal and the non-delayed signal according to the equations (1)–(5), and obtains quantity of the movement of the picture per second. When the moving quantity thus detected is larger than a given value, the pictures moves largely at every seconds. In this case, the moving quantity detector 19 outputs a detection signal "1", for example. The switch 18 selects the terminal H to supply the output signal of the memory 4a to the D/A converter 8. Accordingly, the odd and even field pictures for producing the stereoscopic image have a delay time of one field period between them. The user sees the pictures on the monitor 20 using the liquid crystal driver 200. Since the speed of the picture movement is fast, the odd and even field pictures thus displayed include sufficient parallax therebetween and the user feels the sense of stereoscopic image, although the delay quantity of the picture is small.

In contrast, when the movement quantity of the picture is smaller than a given value, a large delay time is required in order to sufficiently separate the odd and even pictures to be supplied to the eyes of the user. In this case, the moving quantity detector 19 outputs the detection signal "0". The switch 18 selects the terminal L to supply the output signal of the memory 4b to the D/A converter 8. The odd and even field pictures for producing the stereoscopic image have a delay time of two field periods between them. Since the speed of the picture movement is slow this time, the delay quantity of the picture is set to be large. As a result, the odd and even field pictures displayed include sufficient parallax and the user feels the sense of the stereoscopic image.

In the above described embodiment, the given value compared with the movement speed of the pictures should be sensuously determined, by experiments, in consideration of a relation between the delay quantity and the moving speed of the picture. The delay quantity cannot be determined uniformly to a fixed value because the optimum interval of the odd and even field pictures displayed on the screen varies depending on the video source. For example, in order to create a stereoscopic image in which an object is moving at a position one meter ahead of the user, the pictures to be displayed are so designed that the view lines of the user's left and right eyes cross at a point one meter ahead of the user. If the user sees the pictures with a distance 50 [cm] to the screen, the optimum displacement between of the odd field picture and the even field picture displayed on the screen is determined by calculating a distance between two points at which the view lines of the user watching the object pass a vertical plane positioned 50 [cm] ahead of the user. Therefore, if the moving speed of the picture is known, a necessary delay time may be obtained. Since the video sources include various scenes and the optimum distance of the pictures is variant in practice, the appropriate delay time of the memory section is preferably determined by experiments, in consideration of the above-described relationship.

As described above, according to the third embodiment, the delay quantity of the pictures may be varied according to the moving speed of thereof, and therefore the user can stably see the stereoscopic images irrespective of variation of the moving speed of the pictures. In the above embodiment, two different delay quantities are produced by two memories, however, more different delay quantities may be produced by additionally providing memories and employing a multiplexer in place of the switch 18. In such a case, moving quantity detector 19 selects one of the delay quantities using a multi-bit detection signal. By so doing, delay quantity may be controlled more precisely according to the moving speed, and the production of the stereoscopic image may be stabilized. Further, the displacement of the field pictures for producing the stereoscopic image may be altered according to the arbitrary selection of user from multiple stages such as "small", "medium" and "large", thereby creating stereoscopic images of various senses. To accomplish this, the given speed value of the moving quantity detector 19 and switching timings of the memory section are changed according to the user's selection.

4th Embodiment

The fourth embodiment relates to a method of stereoscopic image display using general (two-dimensional) picture reproduction devices with the aid of an external control device.

Figure 7A:
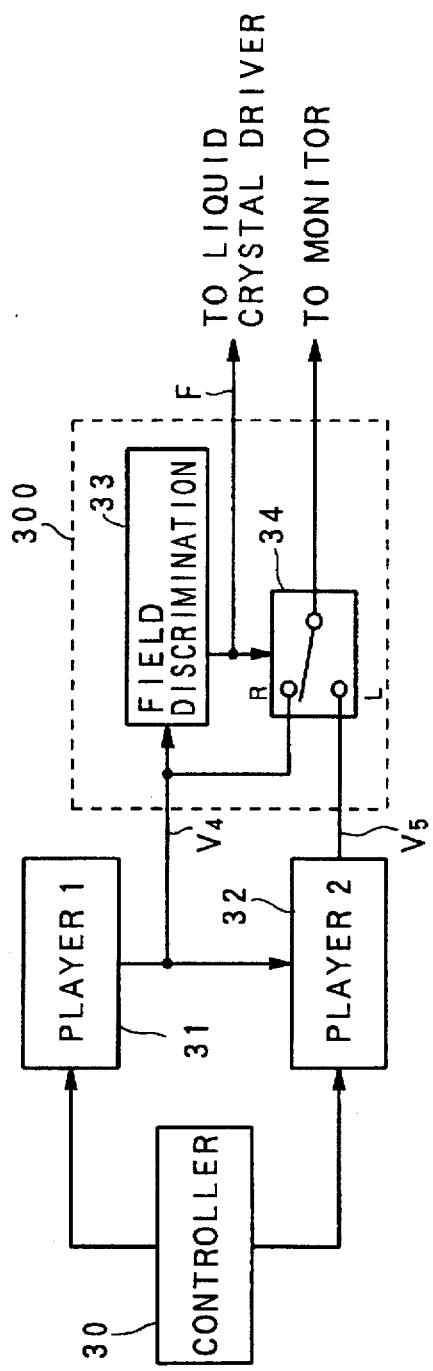
FIG. 7A is a block diagram illustrating a construction of a system according to a first example of a fourth embodiment.

A first example of the fourth embodiment will be described below. FIG. 7A illustrates a construction of a system according to the first example of the fourth embodiment. The controller 30 controls the operation of the players 31 and 32 which are normal picture reproduction devices, such as video disc reproduction devices or VTRs. The field switch circuit 300 includes the field discrimination circuit 33 and the switch 34. The field discrimination circuit 33 separates the synchronizing signals from the original picture signal and outputs a field switching signal F similarly to the first embodiment. The switch 34 turns over at every field periods according to the field switching signal F. In addition, the system further requires a monitor for displaying the stereoscopic pictures and a liquid crystal driver for use by the user. Since the monitor and the liquid crystal driver used in the first to third embodiment are usable in this embodiment, the illustration and description thereof will be omitted. The player 31 supplies the original picture signal $V_7$ or the synchronizing signal to the player 32, and the players 31 and 32 operate synchronously with each other. The output of the player 31 is supplied to the field discrimination circuit 33 and the input terminal R of the switch 34. The output of the player 32 is supplied to the input terminal L of the switch 34. The players 31 and 32 contain recording media on which identical information are recorded, and can reproduce recorded information at arbitrary timings under the control of the controller 31, respectively. The controller 30 supplies control signals to the players 31 and 32 so that they reproduce recorded pictures with a predetermined delay time between them (e.g., corresponding to one frame period). The players 31 and 32 reproduce picture signals at the timings designated by the controller 30. The player 32 outputs the original picture signal $V_5$ delayed by the predetermined time from the original picture signal $V_4$. Therefore, by controlling the switch 34 according to the field switching signal F supplied from the field discrimination circuit 33, stereoscopic images can be produced. In this way, stereoscopic image display can be achieved using normal picture reproduction devices. In the above example, the players 31 and 32 may be controlled by manual operation, in theory.

Figure 7B:
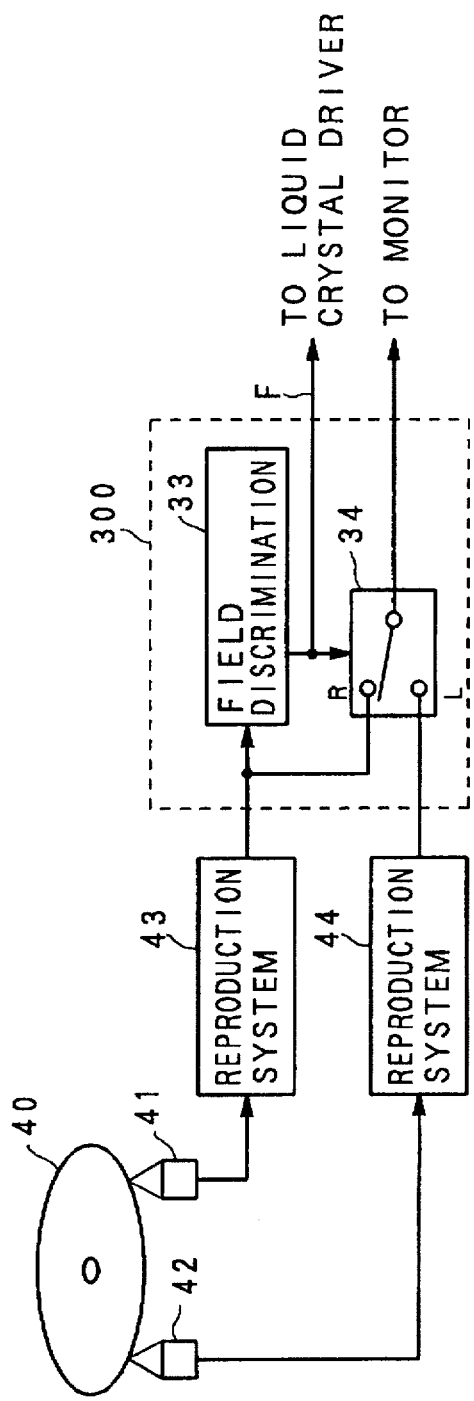
FIG. 7B is a block diagram illustrating a construction of the system according to a second example of a fourth embodiment.

In another example of the fourth embodiment, optical disc players are employed for reproducing pictures. FIG. 7B illustrates a construction of the system according to the second example. The optical disc 40 on which video signals are recorded is rotated, and RF signals are reproduced therefrom by the pickups 41 and 42. The reproduction systems 43 and 44 demodulate the RF signals and output picture signals. The field switch circuit 300 has the same structure as that shown in FIG. 7A. The description relating to the operation of the servo system will be omitted for the sake of brevity. Since the monitor and the liquid crystal driver used in the first to third embodiment can be also used in this embodiment, the illustration and description thereof will be omitted. The optical disc 40 is rotated under the control of a servo system (not shown), and the pickups 41 and 42 read approximately identical track with certain delay time therebetween. The delay time may be one field period, one frame period or else. In this example, the pictures supplied to the terminals R and L of the switch 34 include time difference therebetween, and therefore the switch 34 outputs stereoscopic pictures which include odd field picture and even field picture having a delay time therebetween.

As described above, according to the fourth embodiment, stereoscopic pictures can be readily produced by controlling known picture reproduction devices by the external controller. In the first example, stereoscopic pictures are obtained by connecting two players and the field switching circuit. In the second example, stereoscopic pictures are obtained by connecting a field switching circuit to the output side of the disc player having two pickups, or providing the field switching circuit within the disc player. The application of the fourth embodiment is not limited by the type of the reproduction device. The first example is applicable to any devices including memory of a sufficient capacity, and the second example is applicable to any devices including two signal reading elements, (e.g., two pickups or two heads), such as disc reproduction device, VTR, etc.

The above described first to fourth embodiments may be modified in other various forms. For example, the above embodiments are applicable to not only to NTSC system but to other television systems such as PAL or SECOM systems. In such a case, the oscillation frequency of the oscillator and shift quantity of the phase shifting circuit may be altered. In addition, the above embodiments may be employed in combination. Particularly, the moving direction detector of the second embodiment and the moving quantity detector of the third embodiment perform similar functions, and therefore some components of them can be used in common.

2nd Concept of the Invention

A second concept of the stereoscopic image display according to the present invention will be described. In order to give the sense of stereoscopy to a user, pictures captured by the eyes of the user need to have a parallax between them. It is difficult to produce the pictures with the parallax from pictures of a still object. However, if positions of an object in the pictures captured by the eyes of the user are slightly displaced from each other on a screen or else, it equivalently results in the same effect as the case where the user sees the object with parallax, and hence the user feels the sense of stereoscopy. This will be described more specifically by referring to FIG. 8. As illustrated, the original picture $G_1$ includes an image of a man, and by moving the position of the man in the picture $G_1$, the modified picture $G_2$ is obtained. Namely, in the modified picture $G_2$, the position of the man is slightly displaced (shifted) from the position in the original picture $G_1$. By composing the pictures $G_1$ and $G_2$ having a parallax therebetween, a composite picture $G_0$ is produced. When seeing the composite picture $G_0$, the user feels a sense of stereoscopy. In practice, the composite picture $G_0$ is produced by displaying the original picture $G_1$ and the modified picture $G_2$ alternately at every field periods based on the field synchronizing signal of the video signal. In order to supply the pictures $G_1$ and $G_2$ alternately to the eyes of the user, electronic shutters $S_L$ and $S_R$ which alternately open and close at every field periods are arranged in front of the eyes of the user. Namely, the electronic shutters $S_L$ and $S_R$ alternately become transmissible at every field periods, and the user sees the picture $G_1$ by one eye and sees the picture $G_2$ by the other. Since the pictures $G_1$ and $G_2$ include the parallax therebetween, the user can feel the sense of stereoscopy. The modified picture $G_2$ can be produced by two methods. The first method is to change the display position of whole picture on the screen, and the second method is to change the display position of only moving picture component thereof (e.g., images of a moving object). The first method is effective in producing the stereoscopic image in still picture portion, and the second method is effective in producing the stereoscopic image in moving picture portion. The present invention utilizes the first and the second methods in combination, to adaptively perform stereoscopic image display in both still picture portion and moving picture portion.

Figure 8:
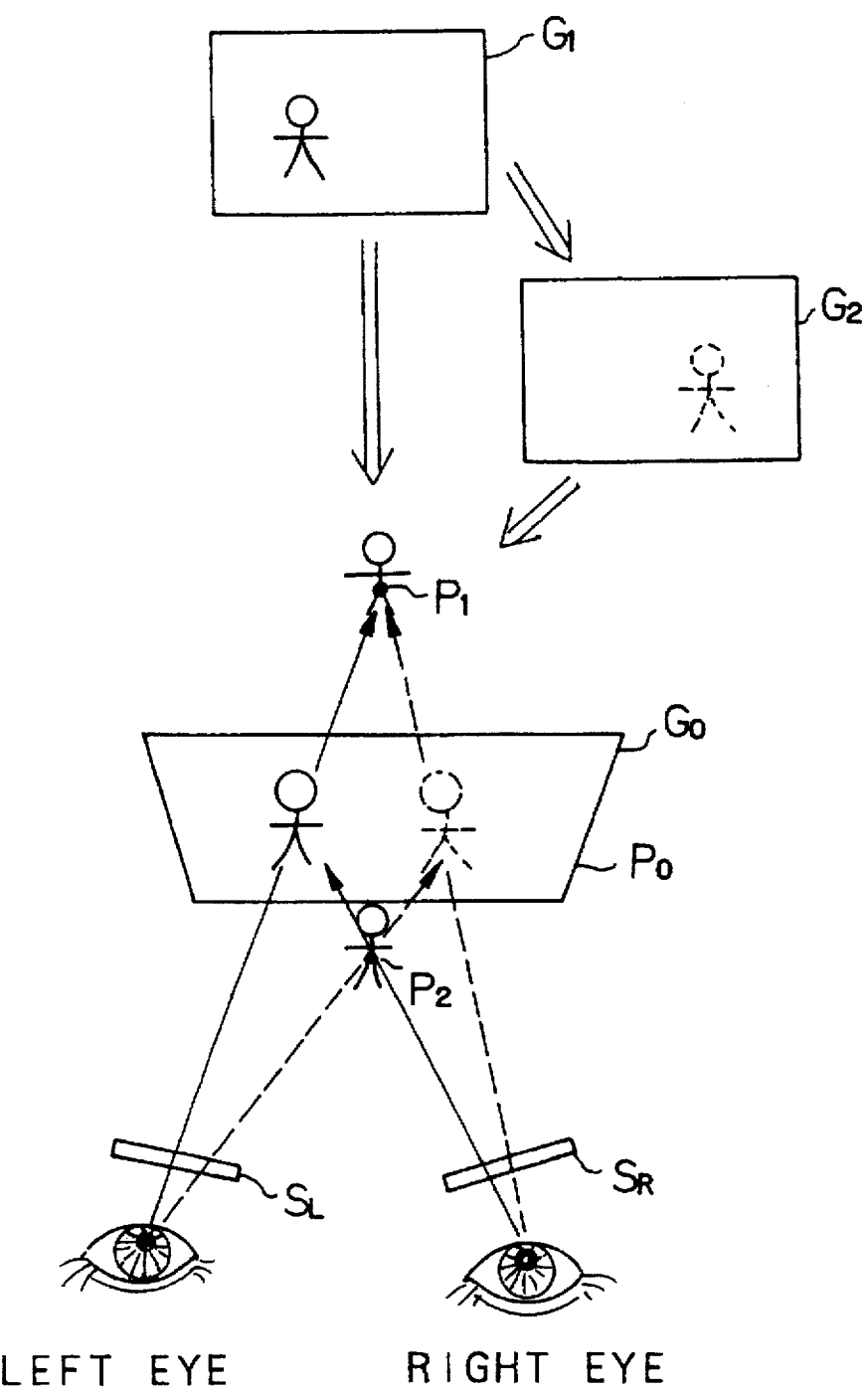
FIG. 8 is a diagram for the explanation of a second concept of the present invention.

Firstly, the first method will be described in more detail. In order to produce stereoscopic images in still picture portion of the pictures, the display position of whole original picture $G_1$ is slightly shifted. One specific measure of this modification is to shift the position of the synchronizing signal of the modified picture $G_2$ from the normal position, i.e., the position of the synchronizing signal of the original image $G_{-1}$, thereby the display position of whole picture $G_1$ is shifted relatively. Another measure is to alter the read-out address of the video memory where the original picture $G_1$ is written when the stored picture data is read out therefrom. According to one of the above measures, display position of the object in the modified picture $G_2$ is changed with respect to that in the original picture $G_1$. By supplying the original picture $G_1$ and the modified picture $G_2$ alternately to the eyes of the user, using the electronic shutters, the stereoscopic images are created. Now, it is assumed that the right electrical shutter $S_R$ passes the original picture $G_1$ to the right eye of the user, and the left electronic shutter $S_L$ passes the modified picture $G_2$ to the left eye of the user. As illustrated in FIG. 8, the view line of right eye directed to the image of the man in the original picture $G_1$ (solid arrow) crosses the view line of the left eye directed to the image of the man in the modified picture $G_2$ (dotted arrow) at the point $P_2$ on the front side (viewer's side) of the screen. Therefore, the user feels as if the image of the man is coming out of the screen to the position $P_2$ (see. FIG. 8). Namely, the stereoscopic image appears before the screen, on the user's side. Reversely, when the right electronic shutter $S_R$ passes the modified picture $G_2$ to the right eye of the user and the left electronic shutter $S_L$ passes the original picture $G_1$ to the left eye of the user, the view line of right eye directed to the man in the original picture $G_1$ (solid arrow) crosses the view line of the left eye directed to the man in the modified picture $G_2$ (dotted arrow) behind the screen. Therefore, the user feels as if the image of the man is drawn into the screen to the position $P_1$ (see. FIG. 8). Namely, the stereoscopic image appears behind the screen. The degree of the stereoscopic sense changes depending upon the quantity of displacement between the original picture $G_1$ and the modified picture $G_2$. When the display position of the whole original picture is shifted in the above-described manner, portions of the pictures having contours or outlines appear to be coming out of or drawn into the screen, thereby the stereoscopic display can be accomplished.

Next, the second method will be described. The second method is effective in producing stereoscopic images for the portions having moving picture components, and is basically based on the first concept of the present invention already described. Namely, if the man in the original picture $G_1$ is walking or running, the display position of the man varies as the time passes. In this view, the modified picture $G_2$ is produced by delaying the original picture $G_1$ using a video memory. The relation between the display positions of the pictures $G_1$ and $G_2$ is identical to the case of the above described first method. Therefore, by supplying the pictures $G_1$ and $G_2$ alternately to the eyes of the user, the user feels the sense of stereoscopic image of the man as if it is coming out of or drawn into the screen.

5th Embodiment

Figure 9:
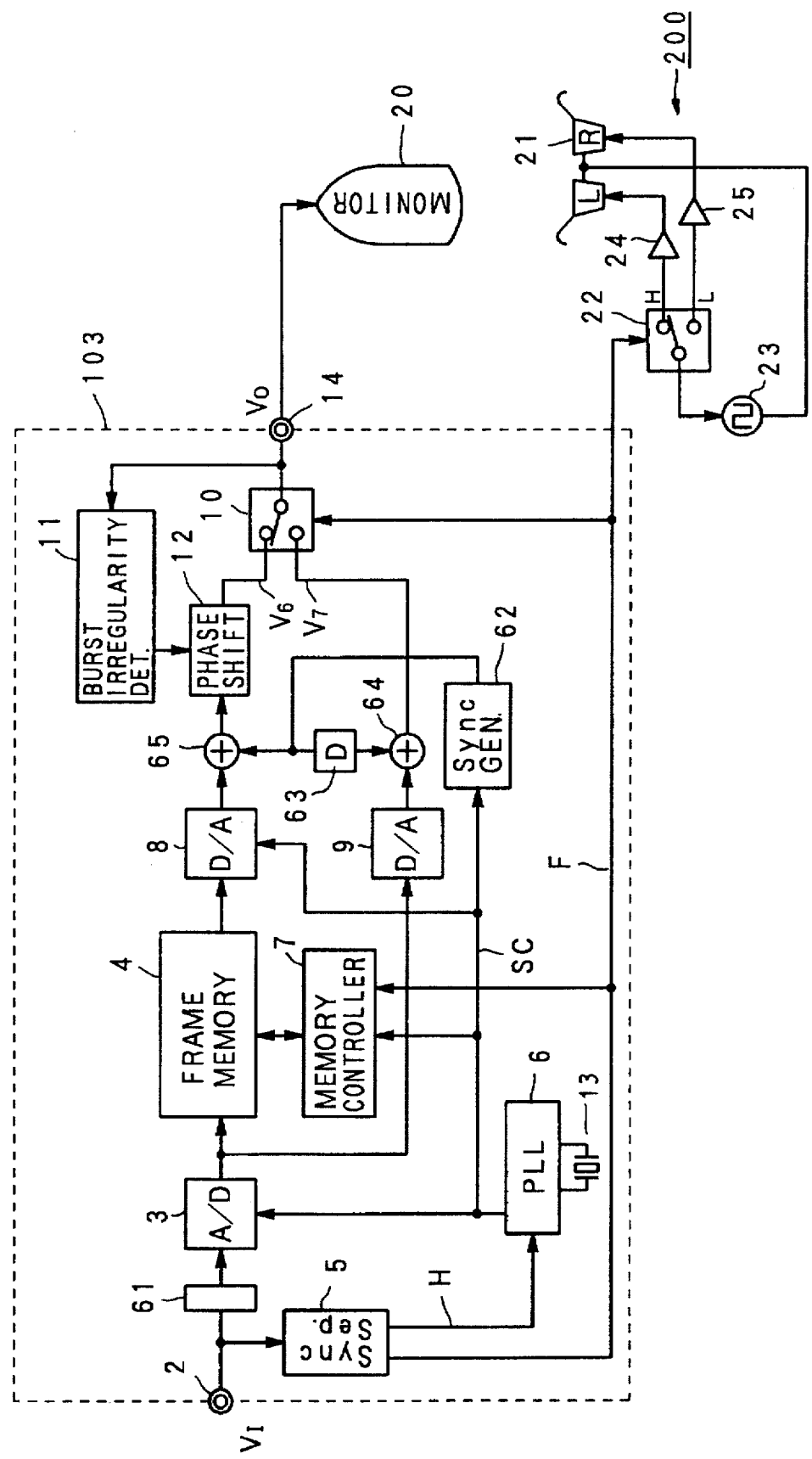
FIG. 9 is a block diagram illustrating a construction of the stereoscopic image displaying apparatus according to a fifth embodiment.

The fifth embodiment of the present invention will be described with reference to FIG. 9. FIG. 9 illustrates a construction of the stereoscopic image displaying apparatus according to the fifth embodiment. The components of the apparatus identical to those of the first embodiment shown in FIG. 3 will be represented by identical reference numerals and the description thereof will be omitted for the sake of brevity. The apparatus differs from the apparatus of the first embodiment in the following points. The synchronizing signal eliminator 61 eliminates the synchronizing signals from the original picture signal $V_I$, and supplies only the image portion of the picture signal to the A/D converter 3. The switch 10 is constituted by an analog switch, a multiplexer or the like. The switch 10 selects the modified picture signal $V_7$ when the field switching signal F is "1" and selects the delayed picture signal $V_6$ when the field switching signal F is "0", to output the selected signal as the composite picture signal $V_0$. The synchronizing signal generator 62 generates a horizontal synchronizing signal synchronous with the horizontal synchronizing signal of the original picture signal $V_I$ based on the sampling signal SC. The delay circuit 63 delays the horizontal synchronizing signal generated by the synchronizing signal generator 62 for a predetermined delay time. The adder 64 adds the delayed horizontal synchronizing signal to the D/A converted original picture signal to produce the modified picture signal $V_7$. The adder 65 adds the non-delayed horizontal synchronizing signal to the picture signal which is one frame period delayed by the frame memory 4, and produces the delayed picture signal $V_6$. In the following description, pictures corresponding to the modified picture signal $V_7$ and the delayed picture signal $V_6$ are referred to as pictures $G_7$ and $G_6$, respectively.

Figure 11:
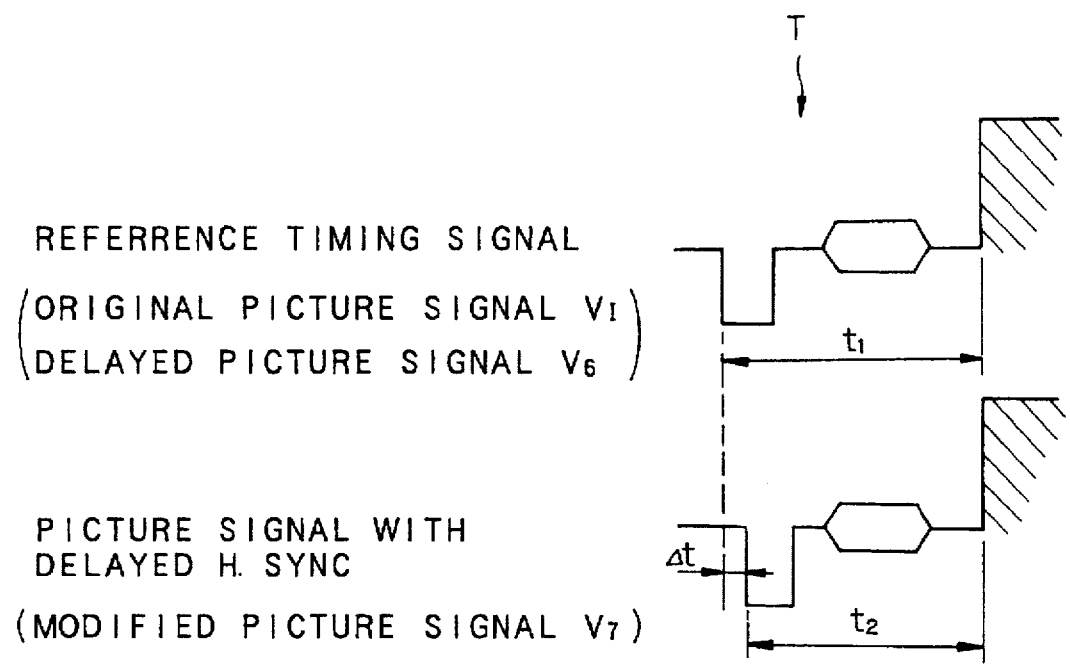
FIG. 11 is a diagram illustrating portions of the horizontal synchronizing signals of the picture signals.

Next, the operation of the apparatus will be described with reference to FIGS. 9 to 11. FIG. 10 is a timing chart of the signals operated in the apparatus shown in FIG. 9. In FIG. 10, the alphabets A, B, C, ... specify frame pictures, and the numbers 1, 2, ... attached to the alphabets specify field pictures. Namely, A1 represents an odd field picture and A2 represents an even field picture. The field pictures A1 and A2 constitute a frame picture A. Referring to FIG. 9, the original picture signal $V_I$ is supplied to the synchronizing signal eliminator 61 in which the synchronizing signal is eliminated, and then supplied to the A/D converter 3 to be digitized. The original picture data outputted by the A/D converter 3 is written into the frame memory 4, and read out therefrom in the order written therein with a delay time of one frame period under the control of the memory controller 7. The D/A converter 8 converts the original picture data delayed by the frame memory 4 into an analog signal and supplies it to the adder 65. The synchronizing signal generator 62 generates the horizontal synchronizing signal, based on the sampling signal SC, approximately synchronous with the timings of the synchronizing signals of the original picture signal $V_I$. The adder 65 adds the horizontal synchronizing signal thus generated to the delayed picture signal. As a result, the picture signal $V_6$ delayed by one frame period from the original picture signal $V_I$ is supplied to the switch 10 (see FIG. 10).

On the other hand, the D/A converter 9 converts the picture data outputted from the A/D converter 3 into the analog picture signal. The delay circuit 63 gives a delay time Δt (see. FIG. 10) sufficiently shorter than the horizontal synchronizing period to the horizontal synchronizing signal supplied from the synchronizing signal generator 62. The adder 64 adds the horizontal synchronizing signal slightly delayed by the delay circuit 63 to the picture signal to produce the modified picture signal $V_7$. As a result, the modified picture signal $V_7$ includes the field pictures at the same timings as the original picture signal $V_I$ (see FIG. 10), but the position of the horizontal synchronizing signal is slightly shifted. This is illustrated in FIG. 11. As seen from FIG. 11, the horizontal synchronizing signal of the modified picture signal $V_7$ is delayed, by the delay time 66 t, from the horizontal synchronizing signal of the original picture signal $V_I$. The switch 10 multiplexes the modified picture signal $V_7$ and the delayed picture signal $V_6$ in accordance with the field switching signal F whose logical level reverses at every field periods, and outputs the multiplexed signal as the stereoscopic picture signal $V_O$ (see FIG. 10). Thus, the stereoscopic picture signal $V_O$ includes the repetition of the field pictures having delay time of 1/60 [sec] therebetween.

On the other hand, the field switching signal F is also supplied to the liquid crystal driver 200 worn by the user. To the switch 22, the driving pulse signal is supplied from the oscillator 23. The driving pulse signal selected by the switch 22 is applied to the liquid crystal panels of the stereoscopic glasses 21 by the drivers 24 and 25. Therefore, the left and right liquid crystal panels are alternately driven, at every field periods, in accordance with to the field switching signal F. When the driving pulse signal is applied to the liquid crystal panel, the liquid crystal molecules thereof are oriented toward a single direction and an optical rotatory power of the panel is lost, thereby making the panel transmissible. When the driving pulse signal is not applied, the liquid crystal panel retains the optical rotatory power and do not transmit light. Namely, the stereoscopic glasses 21 function as optical shutters which alternately and repeatedly open and close at every field periods. Since the opening and closing of the liquid crystal panels are responsive to the field switching signal F which is synchronous with the stereoscopic picture signal $V_O$ displayed on the monitor 20, the user wearing the stereoscopic glasses 21 sees only one of the odd and even field pictures by his left eye and only the other field pictures by his right eye. The left liquid crystal panel of the stereoscopic glasses 21 is transmissible when the field switching signal is "1", and the right liquid crystal panel of the stereoscopic glasses 21 is transmissible when the field switching signal is "0". As a result, the user sees only the odd field pictures A1, B1, C1, . . . by his left eye and only the even field pictures B2, C2, D2, . . . by his right eye. In this manner, the user sees the stereoscopic image produced by the modified image $G_2$ and the delayed picture signal $G_3$. More specifically, when the original picture signal $V_I$ includes moving picture component, the position of the moving picture component in the picture data outputted by the frame memory 4 is different from the position of the moving picture component in the picture data which does not pass the frame memory 4. The user sees stereoscopic images at the distance corresponding to the speed of the moving picture component.

In the still picture portion of the original picture $G_1$, including the case where the original image $G_1$ does not include any moving picture components, the sense of stereoscopic image corresponding to the delay quantity of the delay circuit 63 is obtained. The start point of the image display on the monitor 20 is determined based on the falling edge of the horizontal synchronizing signal. Namely, when the position of the horizontal synchronizing signal is changed, the display position of the picture on the monitor 20 is shifted, in the horizontal direction, from the display position of the picture whose horizontal synchronizing signal is not changed. In FIG. 11, the horizontal synchronizing signal of the modified picture signal $V_7$ is delayed, by an offset Δt, from that of the original picture signal $V_I$, and hence the time period $t_2$ from the falling edge of the horizontal synchronizing signal to the head of image portion (oblique lined portion) of the picture signal is shorter than the time period $t_1$ of the original picture signal $V_I$. As a result, the picture display position of the modified image $G_2$ is shifted left on the monitor in comparison with the picture of the original picture signal $V_I$. The original picture and the modified picture $G_2$ thus shifted have the parallax therebetween, and accordingly the sense of stereoscopic image is produced. When the switches 10 and 22 are so designed that the delayed pictures of odd field are supplied to the left eye and the modified pictures of even field are supplied to the right eye, the view lines of the user cross before the screen of the monitor and the user senses the stereoscopic images before the screen. Reversely, in order to produce the stereoscopic image behind the screen, switching manner of either one of the switches 10 or 22 is reversed. By varying the delay quantity of the delay circuit 63, the sense of depth of the stereoscopic images (i.e., relative interval between the actual display position of the pictures and the cross point of the user's view lines) may be controlled.

As described above, according to the fifth embodiment, the stereoscopic image can be produced from normal (two-dimensional) picture signals, and the sense of stereoscopic image is obtained not only in moving picture portion but in the still picture portion. In the above described apparatus, the synchronizing signal eliminator 61 may be omitted if the memory controller 7 inhibits writing of the synchronizing signal into the frame memory 4, because doing so results in the equivalent effect. In FIG. 9, the analog horizontal synchronizing signal is generated and added to the picture signal, however, the horizontal synchronizing signal may be produced by digital subtractions before the D/A converters 8 and 9. In this case, timings of the subtractions are delayed in stead of the use of the delay circuit 63. Although the delay circuit 63 is provided between the synchronizing signal generator 62 and the adder 64, it may alternatively be arranged between the synchronizing signal generator 62 and the adder 65. In this case, the position of the stereoscopic image is moved.

6th Embodiment

In the sixth embodiment described below, the display position of the picture is shifted by altering the read-out address of the frame memory, in stead of delaying the horizontal synchronizing signal, thereby obtaining the equivalent effect as the fifth embodiment.

Figure 12:
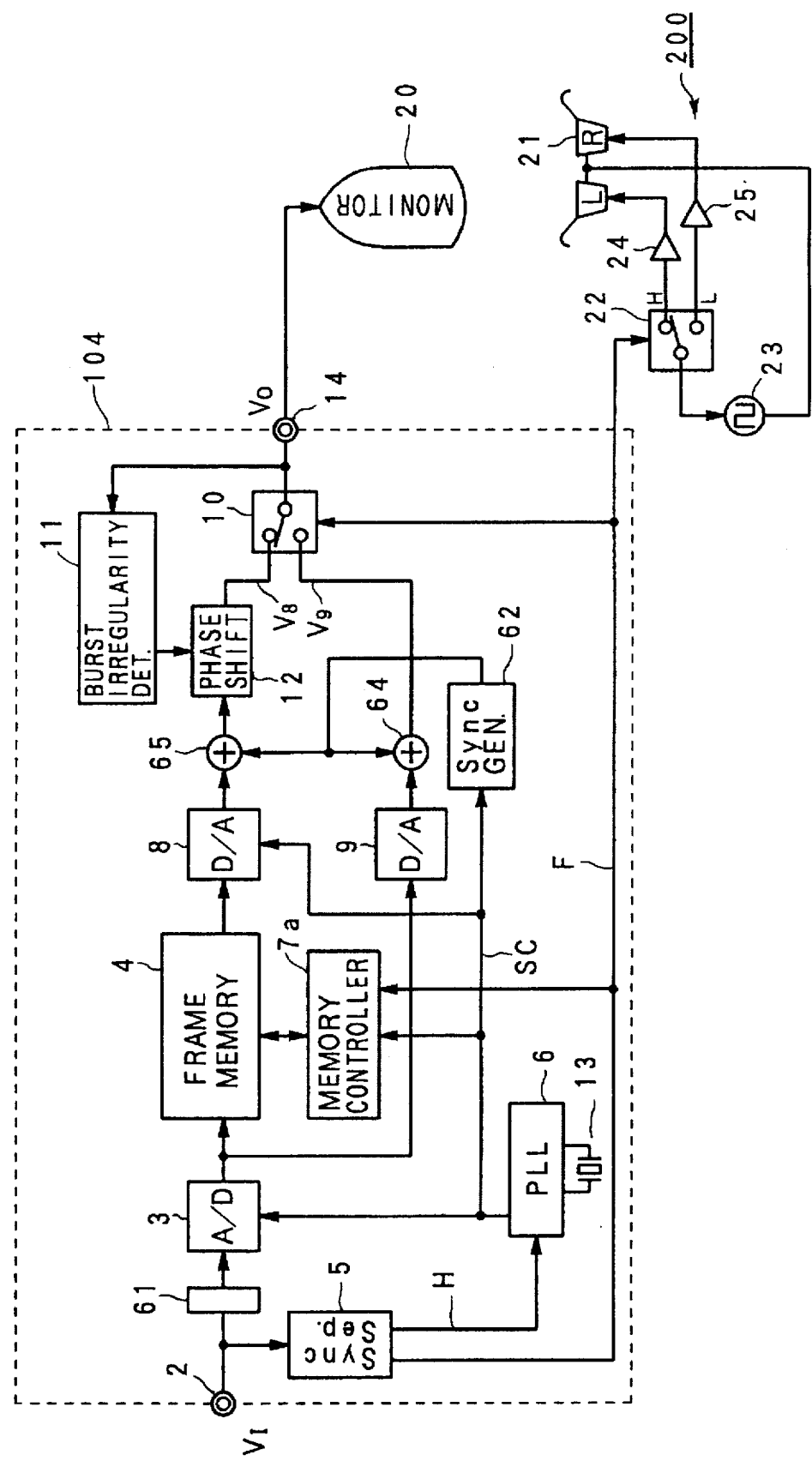
FIG. 12 is a diagram illustrating a construction of the stereoscopic image displaying apparatus according to a sixth embodiment.

FIG. 12 illustrates a construction of the stereoscopic image displaying apparatus according to the sixth embodiment. In FIG. 12, the apparatus is provided with a memory controller 7a for altering the read-out address of the frame memory 4, in stead of the delay circuit 63 and the memory controller 7 of the apparatus shown in FIG. 9. The memory controller 7a receives the field switching signal F. Since the delay circuit 63 is eliminated in this embodiment, the signal supplied from the adder 64 to the switch 10 (referred to as $V_9$) is substantially identical to the original picture signal $V_I$, although the signal $V_9$ includes a negligible delay time of the circuit. The rest of the components of the apparatus are identical to those of the fifth embodiment shown in FIG. 9, and therefore the description thereof will be omitted.

Figure 13:
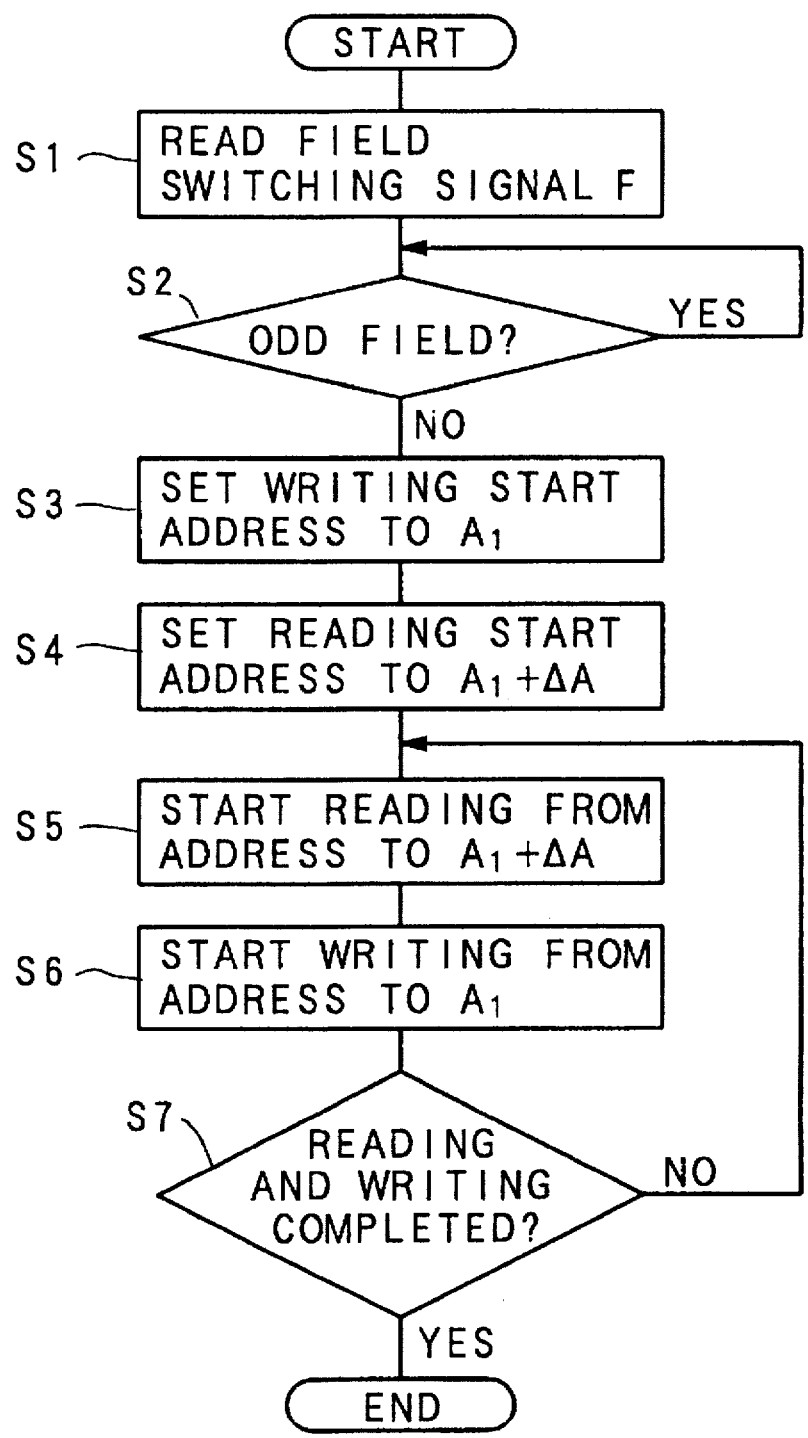
FIG. 13 is a flowchart illustrating an operation of the stereoscopic image displaying apparatus shown in FIG. 12.

Next, the operation of the apparatus will be described with reference to FIGS. 12 and 13. The original picture signal $V_I$ is stored in the frame memory 4 in the same manner as the sixth embodiment, however, the memory controller 7a reads out the stored picture data in a manner different from that of the sixth embodiment. The memory controller 7a reads the field switching signal F (step S1), and judges the logical level of the field switching signal F (step S2). When the odd field picture signal is supplied (step S2:YES), the switch 10 selects the original picture signal $V_9$ as seen from FIG. 10, and hence the memory controller 7a do not perform any special function. When the even field picture signal is supplied (step S2:NO), the switch 10 selects the delayed picture signal $V_8$. In step S3, the memory controller 7a sets the writing start address from which data of next picture is written in a normal manner (e.g., address $A_1$). In step S4, read-out of the data of previous frame picture stored in the frame memory 4 is started. Here, the memory controller 7a adds an offset ΔA to the reading start address $A_1$. By this operation, picture data read-out from the frame memory 4 is relatively shifted in horizontal direction. In step S5, the memory controller 7a starts reading out the stored picture data from the reading start address ($A_1$+ΔA). In step S6, the memory controller 7a permits the frame memory 4 to start writing the picture data of subsequent field picture, supplied via the A/D converter 3, from the writing start address $A_1$. In step S7, the memory controller 7a judges whether the picture data of the predetermined quantity (i.e., corresponding to one field picture) has been written or not, and whether the picture data of the preceding field has been read out or not. If either the writing or reading of the picture data is still continuing (step S7:NO), steps S5 and S6 are repeated. If the writing and reading are completed (step S7:YES), the operation for this frame picture ends.

Figure 14:
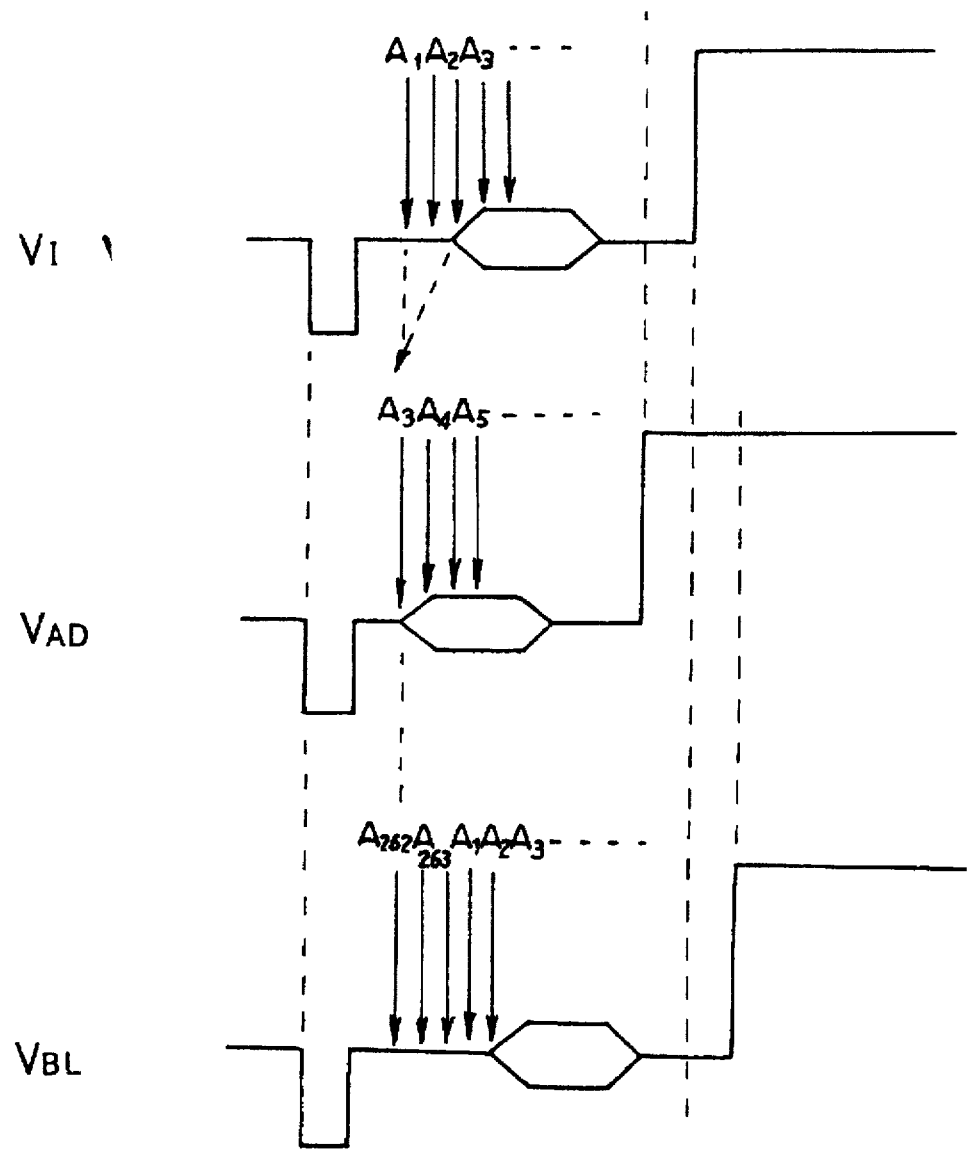
FIG. 14 is a diagram illustrating waveforms of signals obtained by shifting a reading start address of a frame memory.

FIG. 14 illustrates waveforms of signals obtained by shifting the reading start address. As shown in FIG. 14, the burst signal portion of the original signal $V_I$ is written into the frame memory 4 from the writing start address $A_1$. In order to shift the whole picture left on the monitor, the memory controller 7a sets the reading start address to $A_3$ (=the writing start address $A_1$+the offset ΔA(=2)), and starts reading out the stored data of the original picture from the reading start address $A_3$. Therefore, the pixel data stored in the address $A_3$ of the frame memory 4 is shifted left and displayed at the position of the first pixel data (see. signal $V_{AD}$ of FIG. 14). Consequently, the whole picture of the picture signal $V_{AD}$ is shifted left for two pixels. Alternatively, in order to shift the whole picture right on the monitor, the memory controller 7a sets the reading start address to $A_{262}$ (=the writing start address $A_1$+the offset ΔA(=−2)), and starts reading the stored data of the original picture from the reading start address $A_{262}$. Therefore, the third pixel data stored in the address $A_3$ is shifted right and displayed at the position of the fifth pixel data (see. signal $V_{DL}$ of FIG. 14). Consequently, the whole picture of the picture signal $V_{DL}$ is shifted right for two pixels. It is noted that, in this case, the data of the addresses $A_{262}$ and $A_{263}$ are read out as the data prior to the data of the address $A_1$. Alternatively to this, preferably, the data of the address $A_1$ may be read out repeatedly three times in succession, in stead of reading out the data of the addresses $A_{262}$ and $A_{263}$. This can reduce the discomfort of the shifted picture due to sudden appearance of dissimilar picture because the identical data is displayed successively. In this manner, the delayed picture $G_8$ is shifted right for two pixels on the monitor.

As described above, according to the sixth embodiment, shifting the reading address of the frame memory provides the effect equivalent to the fifth embodiment in which the delay circuit is arranged. Therefore, the stereoscopic image display can be accomplished without the use of the delay circuit. Especially, since the reading start address of the memory controller 7a may be altered arbitrarily, variant senses of stereoscopic image can be created according to tastes of the user.

7th Embodiment

In the seventh embodiment, moving picture component in the original picture is detected and the positions of the stereoscopic image is controlled between the moving picture component and the still picture component.

Figure 15:
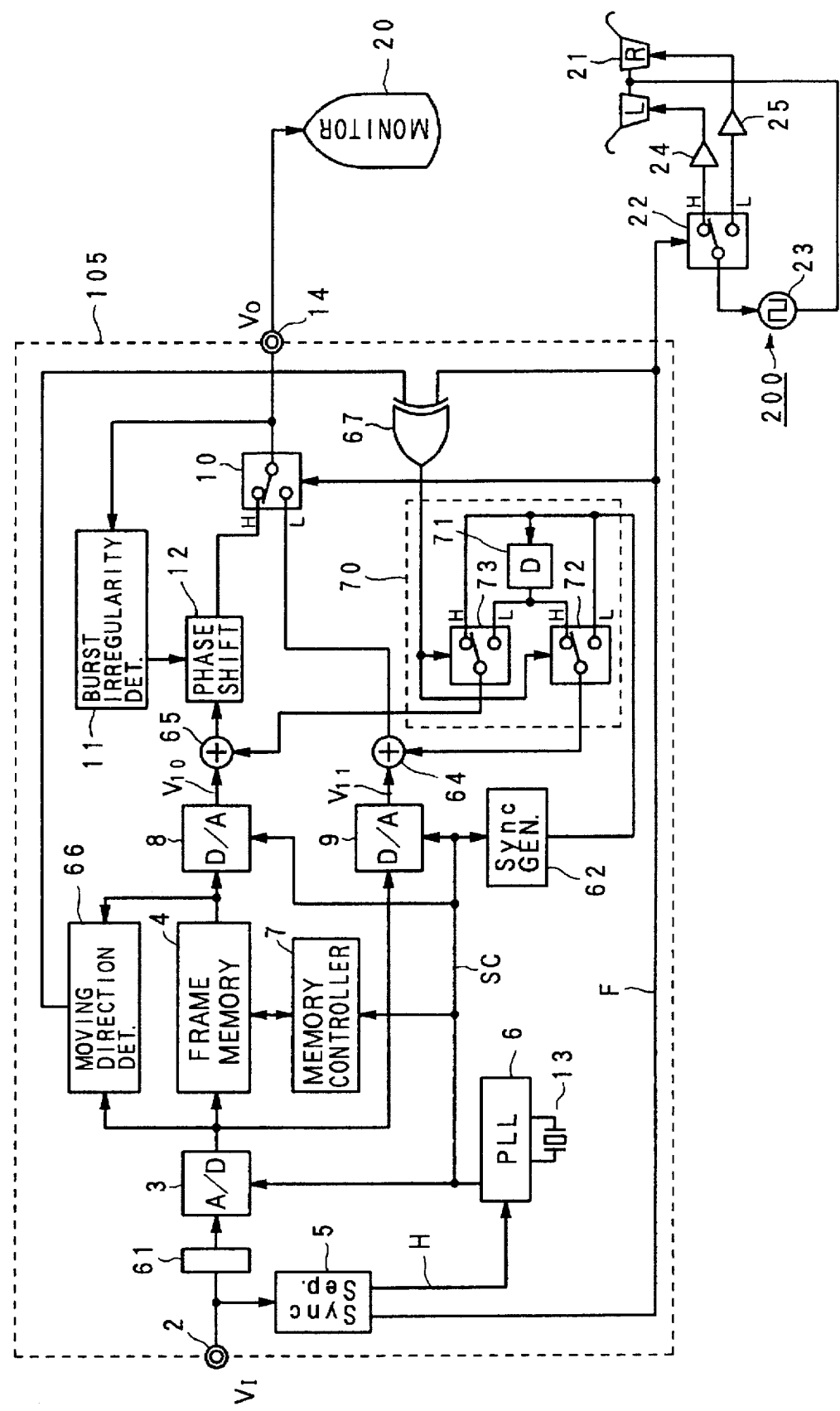
FIG. 15 is a block diagram illustrating a construction of a stereoscopic image displaying apparatus according to a seventh embodiment.
Figure 16:
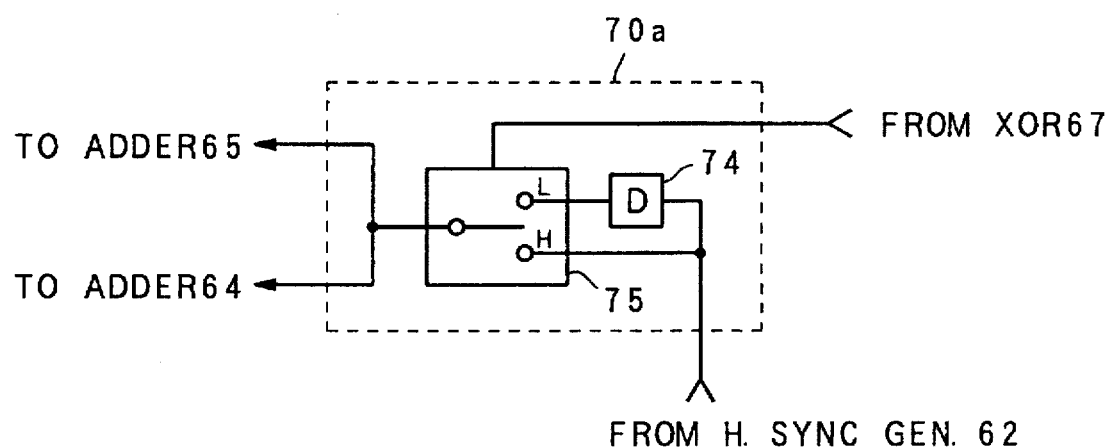
FIG. 16 is a block diagram illustrating a construction of a synchronizing signal switching block according to a seventh embodiment.

FIG. 15 illustrates a construction of a stereoscopic image displaying apparatus according to the seventh embodiment. As shown in FIG. 15, the stereoscopic image displaying apparatus is provided with a moving direction detector 66, a gate circuit 67 and a synchronizing signal switching circuit 70, instead of the delay circuit 63 employed in the fifth embodiment. The moving direction detector 66 receives picture data from the input side and the output side of the frame memory 4, and the gate circuit 67 operates an EXOR of the detection signal of the moving direction detector 66 and the field switching signal F. The synchronizing signal switching block 70 is arranged between the synchronizing signal generator 62 and the adders 64 and 65. The rest of the components of the apparatus are identical to those of the apparatus of the fifth embodiment, and hence the description thereof will be omitted. The synchronizing signal switching block 70 includes a delay circuit 71, a switch 72 and a switch 73. The delay circuit 71 delays the horizontal synchronizing signal supplied from the synchronizing signal generator 62. The switch 72 selectively supplies one of the horizontal synchronizing signal from the delay circuit 71 and the non-delayed synchronizing signal in response to the switching signal from the gate circuit 67, and the switch 73 supplies the other one of the horizontal synchronizing signals to the adder 65. The synchronizing signal switching block 70 may be replaced by the block 70a shown in FIG. 16. As shown in FIG. 16, the synchronizing signal switching block 70a includes a delay circuit 74 for delaying the horizontal synchronizing signal and a switch 75 for selectively supplying one of the delayed and non-delayed horizontal synchronizing signals to the adders 64 and 65.

Next, an operation of the apparatus will be described. In the following description, the non-delayed picture signal is referred to as $V_{11}$ and the image of the non-delayed signal $V_{11}$ displayed on the monitor 20 is referred to as $G_{11}$. Similarly, the picture signal delayed by the frame memory 4 is referred to as $V_{10}$, and the picture of the delayed signal $V_{10}$ displayed on the monitor 20 is referred to as $G_{10}$. This embodiment is aimed to harmonize the sense of stereoscopy in the still picture portions and the moving picture portions. In this view, the moving direction detector 66 detects the direction of the movement of the picture and the manner of displaying pictures of the still picture portions is changed according to the direction of the movement. The moving direction detector 66 detects the moving component of the picture $G_I$ based on the original (non-delayed) picture signal $V_I$ and the picture signal $V_{10}$ delayed one frame period by the frame memory 4. The construction and performance of the moving direction detector 66 is identical to the moving direction detector 15 shown in FIG. 5, and hence the detailed description of its performance will be omitted. It is assumed that the moving direction detector 66 outputs a detection signal "1" when the picture is moving right, and outputs a detection signal "0" when the picture is moving left. Now, assuming that the picture $G_I$ is moving left, the moving direction detector 66 outputs a detection signal "0" and hence the gate circuit 67 supplies the field switching signal F to the synchronizing signal switching block 70. As a result, the delay circuit 71 is connected to the adder 65 at every odd fields, and the horizontal synchronizing signal of the delayed picture signal $V_{10}$ is delayed for a given delay time. When the switches 10, 22, 72 and 73 turn over, the user sees the non-delayed picture $G_{11}$ by his right eye and sees the delayed picture $G_{10}$ by his left eye. While the pictures have left movement, the delayed picture $G_{10}$ of the moving picture portion is positioned on the screen on the right of the non-delayed picture $G_{11}$. The view lines of the user cross before the screen, and the stereoscopic image appears before the monitor. By delaying the horizontal synchronizing signal, whole the delayed picture $G_{10}$ is shifted left, and the user sees the delayed picture $G_{10}$ by his right eye and sees the non-delayed image $G_{11}$ by his left eye. The view lines of the user cross behind the screen, and the stereoscopic image appears behind the monitor. As a result, when the picture is moving left, the user sees the moving picture portion before the screen and sees the still picture portion behind the screen.

Reversely, when the picture $G_1$ is moving right, the moving direction detector 66 outputs the detection signal "1". When the detection signal is "1", the gate circuit 67 inverts the logical level of the field switching signal F and supplies the inverted signal to the synchronizing signal switching block 70. As a result, the delay circuit 71 is connected to the adder 64 at every odd fields, and the horizontal synchronizing signal of the delayed picture signal $V_{11}$ is delayed by a given delay time. Since the user sees the non-delayed picture $G_{11}$ by his right eye and sees the delayed picture $G_{10}$ by his left eye, the delayed picture $G_{10}$ of the moving picture portion is positioned on the screen on the left of the non-delayed picture $G_{11}$. The view lines of the user cross behind the screen, and the stereoscopic image appears behind the screen. By delaying the horizontal synchronizing signal, whole the delayed picture $G_{11}$ is shifted left. The view lines of the user cross on the front side of the screen, and the stereoscopic image appears before the monitor. As a result, when the image is moving right, the user sees the moving picture portion behind the screen and sees the still picture portion before the screen.

In FIG. 15, by inverting the logical level of the detection signal of the moving direction detector 15 or alternatively connecting the output of the switch 73 to the adder 64 and the output of the switch 72 to the adder 65, the sense of stereoscopic image can be emphasized. Namely, by this construction, moving direction of the stereoscopic image in the moving picture portion is added to the moving direction of the stereoscopic image in the still picture portion. It is noted that, in the above described operation, the stereoscopic images of the moving picture portions and the still picture portions alternately come out and are drawn into the screen. In order to make the display positions uniform, an inverter circuit for inverting the logical level of the field switching signal F according to the detection signal of the moving direction detector 66 is provided and the field switching signal F is supplied to the switch 10 via the inverting circuit. With this treatment, the stereoscopic images in both still and moving picture portions are positioned uniformly, irrespective of the moving direction of the pictures. Namely, irrespective of whether the pictures are moving left or right, the stereoscopic images of the moving picture portion and the still picture portion appear in a uniform manner, e.g., the image of the moving picture portion is produced behind the screen and the still picture portion is produced before the screen (or in reversed positional relation).

As described above, according to the seventh embodiment, the positional relation between the images of the moving picture portion and the still picture portion is controlled, so that the sense of stereoscopy is emphasized over (before and behind) the screen.

8th Embodiment

The eighth embodiment aims to produce the sense of stereoscopy not only in horizontal direction but in the vertical direction, even in the still picture portions. A construction of the apparatus according to the eighth embodiment is identical to that of the fifth embodiment, and therefore illustration and description thereof will be omitted. However, it is noted that the memory controller of this embodiment delays the picture for one frame period, and further delays the picture by a delay time corresponding to some horizontal lines to produce a delayed picture $G_{13}$. Here, the picture supplied to the frame memory without delay is referred to as a picture $G_{12}$, and a stereoscopic picture obtained by alternately displaying the delayed picture $G_{13}$ and the non-delayed picture $G_{12}$ is referred to as a stereoscopic picture $G_{14}$. In the embodiments described above, the sense of stereoscopy can be produced in vertical direction only in the moving picture portion. However, in order to produce the sense of stereoscopy in vertical direction in the still picture portions, it is necessary that the memory controller 7 controls the read-out timing of the pictures from the frame memory 4.

Figure 17A:
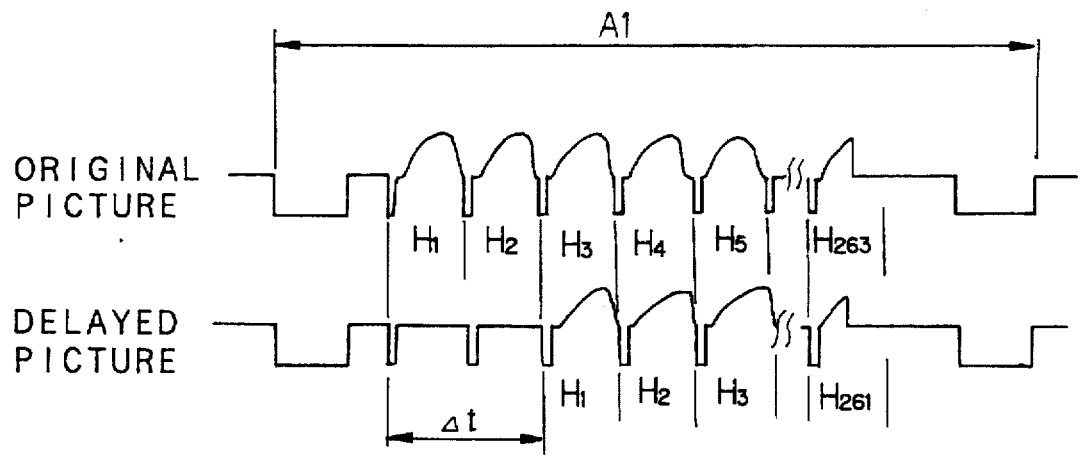
FIG. 17A is a diagram illustrating field picture signals.
Figure 17B:
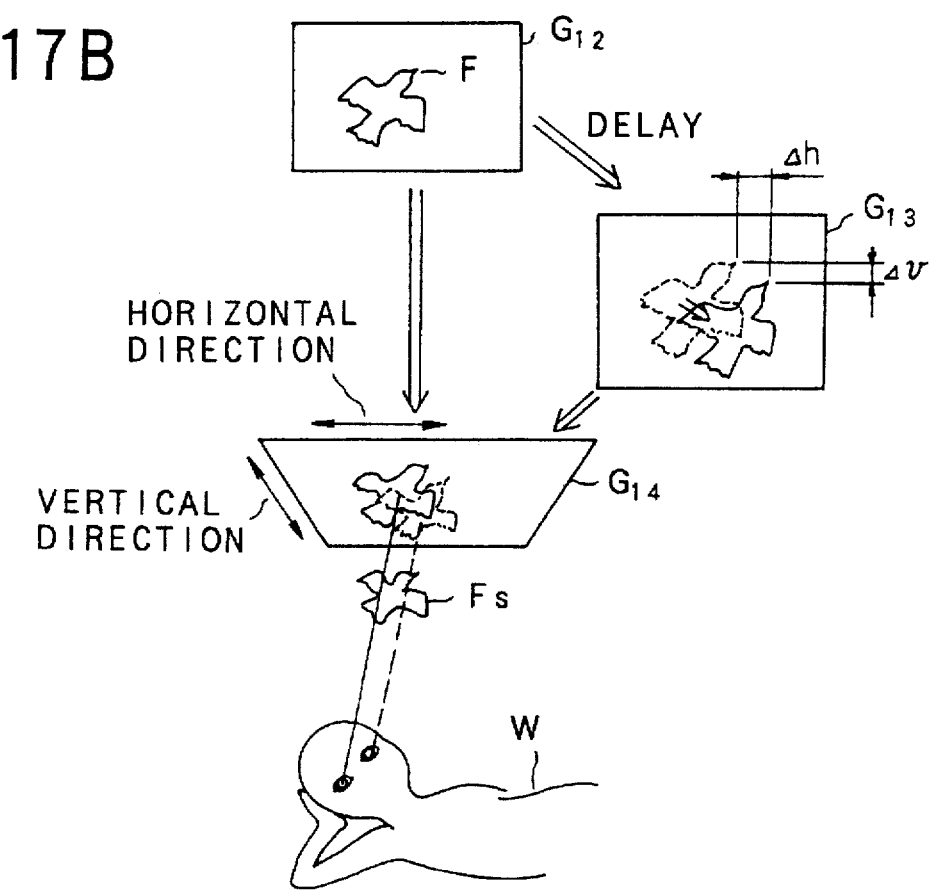
FIG. 17B is a diagram illustrating a condition where stereoscopic image is displayed on a monitor according to a eighth embodiment.

The operation of the apparatus according to this embodiment will be described. FIG. 17A illustrates portions of the field picture signals. As shown in FIG. 17A, the memory controller 7 alters the data read-out address from the frame memory 4 for a time period of some horizontal lines so as to produce displacement of the picture display position in the vertical direction. Namely, the memory controller 7 permits the frame memory 4 to delay the picture written therein for one frame period, and further permits the frame memory 4 to delay the picture for some horizontal synchronizing periods. Then, the frame memory 4 outputs the stored picture in synchronous with the horizontal synchronizing signal. For example, in FIG. 17A, the delayed picture signal is behind by $\Delta t$ (i.e., two horizontal periods) from the original picture signal. FIG. 17B illustrates the condition where the delayed picture signal is displayed on the monitor 20. In FIG. 17B, the picture of the original picture signal supplied to the apparatus is assumed to be the picture $G_{12}$. The original picture $G_{12}$ includes the image of the object F, "a flying bird". By delaying the original picture $G_{12}$ by one frame and some horizontal periods as described above, the image $G_{13}$ is obtained. In the image $G_{13}$, the position of the object is displaced by $\Delta v$ in the vertical direction and by $\Delta h$ in the horizontal direction. The displacement $\Delta h$ in the horizontal direction may be produced by either one of the methods of the fifth or the sixth embodiment. The displacement $\Delta v$ is produced by the delay of the data reading start timing controlled by the memory controller 7, as shown in FIG. 17A. The quantity of this delay is constant for both of the moving picture portion and the still picture portion. These pictures $G_{12}$ and $G_{13}$ are simultaneously displayed on the monitor 20 as illustrated in FIG. 17B. Now, it is assumed that a user W lying on the floor or else is watching the composite picture $G_{14}$ on the screen of the monitor, as shown in FIG. 17B, and the eyes of the user are nearly aligned in vertical direction. As illustrated, the image $F_r$ of the object in the delayed picture $G_{13}$ is displayed at the position displaced from the image of the object F in the original picture $G_{12}$ on the screen. Since the original picture $G_{12}$ and the delayed picture $G_{13}$, constituting the composite image, include the parallax therebetween not only in the horizontal direction but in the vertical direction, the user W watching the stereoscopic picture $G_{14}$ is given a sense of stereoscopic image in both horizontal and vertical direction.

As described above, according to the eighth embodiment, the sense of stereoscopy can be produced in vertical direction in the still picture portions. The seventh embodiment is applicable to this embodiment. That is, by detecting the movement of the picture in the vertical direction, the stereoscopic images in the moving picture portions and the still picture portions can be harmonized.

What is claimed is:

1. A stereoscopic image displaying apparatus comprising:

field switching signal generating means for generating a field switching signal alternately indicating odd field periods and even field periods from an original picture signal;

delaying means for delaying the original picture signal and producing a delayed picture signal;

stereoscopic image signal generating means for alternately selecting one of the original picture signal and the delayed picture signal in accordance with the field switching signal to generate a stereoscopic image signal; and display means for displaying the stereoscopic image signal by alternately supplying pictures of the original picture signal to one eye of a user and pictures of the delayed picture signal to the other eye of the user on the basis of the field switching signal;

a moving direction detecting means for detecting a direction of a moving picture component in the original picture signal based on the original picture signal and the delayed picture signal; and an inverting means for inverting a logical level of the field switching signal to be supplied to the display means in accordance with the detected direction.

2. An apparatus according to claim 1, wherein said delaying means comprises a video memory for delaying the original picture signal by one or more frame periods.

3. An apparatus according to claim 1, wherein said display means comprises a monitor for displaying the stereoscopic image signal; and a shutter means arranged between the monitor and the eyes of the user for alternately shielding one of the eyes of the user.

4. An apparatus according to claim 1, further comprising a picture movement detecting means for detecting a moving picture component in the original picture signal based on the original picture signal and the delayed picture signal; and a display control means for permitting said displaying means to alternately supply one of the original picture signal and the delayed picture signal only when the moving picture component is detected.

5. An apparatus according to claim 4, wherein said display control means permits said display means to simultaneously supply both of the original picture signal and the delayed picture signal to the eyes of the user when the moving picture component is not detected.

6. An apparatus according to claim 1, further comprising at least one additional delaying means for producing the delayed picture signal of different delay time; a moving quantity detecting means for detecting quantity of a moving picture component in the original picture signal based on the original picture signal and one of the delayed picture signals; and a selecting means for selecting one of the delayed picture signal to be supplied to the stereoscopic image signal generating means on the basis of the quantity of the moving picture component.

7. An apparatus according to claim 6, wherein each of said delaying means comprises a video memory for delaying the original picture signal by one or more field periods.

8. An apparatus according to claim 1, further comprising a display position control means for shifting a display position of one of the original picture signal and the delayed picture signal in horizontal direction on the monitor.

9. An apparatus according to claim 8, wherein said display position control means shifts positions of horizontal synchronizing signals in one of the original picture signal and the delayed picture signal.

10. An apparatus according to claim 8, wherein said delaying means comprises a video memory, and said display position control means shifts a read-out position of the video memory from which the original picture signal stored therein is read out, with respect to a writing position from which the original picture signal has been written.

11. An apparatus according to claim 8, further comprising a moving direction detecting means for detecting a direction of a moving picture component in the original picture signal based on the original picture signal and the delayed picture signal, and said display position control means selecting one of the original picture signal and the delayed picture signal whose display position is to be shifted, in accordance with the detected moving direction.

12. An apparatus according to claim 1, further comprising vertical shifting means for delaying one of the original picture signal and the delayed picture signal by one or more horizontal line periods so as to shift a display position of the picture signal in vertical direction of the original picture signal.

* * * * *

UNITED STATES PATENT AND TRADEMARK OFFICE
CERTIFICATE OF CORRECTION

PATENT NO. : 5,684,529
DATED : November 4, 1997
INVENTOR(S) : Takashi Yoshimi, Hiroshi Otsubo, Masanori Nakaigawa, Ryuichiro Yoshimura, Manabu Okamoto, Yoshiki Furuta, Chihaya Oga, Minoru Tateno It is certified that error appears in the above-identified patent and that said Letters Patent is hereby corrected as shown below:

On title page, item [54] and col. 1, lines 1-2, should read as follows:
STEREOSCOPIC DISPLAY USING
MOVEMENT DIRECTION DETECTION Signed and Sealed this Twenty-fourth Day of February, 1998

Attest:

BRUCE LEHMAN

Attesting Officer

Commissioner of Patents and Trademarks